US012535830B2

(12) United States Patent
Kanai et al.

(10) Patent No.: US 12,535,830 B2
(45) Date of Patent: Jan. 27, 2026

(54) HAULING VEHICLE AND HAULING SYSTEM

(71) Applicant: Hitachi Construction Machinery Co., Ltd., Tokyo (JP)

(72) Inventors: Masaki Kanai, Tokyo (JP); Katsuaki Tanaka, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 69 days.

(21) Appl. No.: 18/279,223

(22) PCT Filed: Mar. 23, 2022

(86) PCT No.: PCT/JP2022/013333
§ 371 (c)(1),
(2) Date: Aug. 29, 2023

(87) PCT Pub. No.: WO2022/220029
PCT Pub. Date: Oct. 20, 2022

(65) Prior Publication Data
US 2024/0152157 A1 May 9, 2024

(30) Foreign Application Priority Data
Apr. 14, 2021 (JP) .................................. 2021-068382

(51) Int. Cl.
*G05D 1/617* (2024.01)
*G05D 1/242* (2024.01)
(Continued)

(52) U.S. Cl.
CPC ............ *G05D 1/617* (2024.01); *G05D 1/242* (2024.01); *G07C 5/0816* (2013.01); *G05D 1/247* (2024.01);
(Continued)

(58) Field of Classification Search
CPC ........ G05D 1/617; G05D 1/242; G05D 1/247; G05D 2107/90; G05D 2105/05; G07C 5/0816
See application file for complete search history.

(56) References Cited

U.S. PATENT DOCUMENTS

2016/0282874 A1 9/2016 Kurata
2019/0283736 A1 9/2019 Watanabe

FOREIGN PATENT DOCUMENTS

JP 2003-316438 A 11/2003
JP 2015-26312 A 2/2015
(Continued)

OTHER PUBLICATIONS

International Preliminary Report on Patentability (PCT/IB/338 & PCT/IB/373) issued in PCT Application No. PCT/JP2022/013333 dated Oct. 26, 2023, including English translation of Written Opinion (PCT/ISA/237) (6 pages).
(Continued)

*Primary Examiner* — Michael D Lang
(74) *Attorney, Agent, or Firm* — Crowell & Moring LLP

(57) ABSTRACT

A hauling vehicle including a vehicle body, a distance meter that measures the distance to an obstacle, an in-vehicle controller that controls the vehicle body, and a communication device that communicates with a management controller that manages the vehicle body is provided. In the hauling vehicle, the in-vehicle controller executes primary determination of whether or not the distance meter is in a dirt-presumed state in which dirt of an objective surface of the distance meter is presumed, commands the vehicle body to stop at a current position when determining that the distance meter is in the dirt-presumed state in the primary determination, executes secondary determination of whether or not the distance meter is in the dirt-presumed state after the elapse of a set time from the execution of the primary
(Continued)

determination, transmits an alarm to the management controller through the communication device when determining that the distance meter is in the dirt-presumed state in the secondary determination, and commands the vehicle body to resume travelling of the vehicle body when determining that the dirt-presumed state has been eliminated in the secondary determination.

12 Claims, 15 Drawing Sheets

(51) Int. Cl.
    *G05D 1/247*     (2024.01)
    *G05D 105/05*     (2024.01)
    *G05D 107/90*     (2024.01)
    *G07C 5/08*     (2006.01)

(52) U.S. Cl.
    CPC ..... *G05D 2105/05* (2024.01); *G05D 2107/90* (2024.01)

(56) References Cited

FOREIGN PATENT DOCUMENTS

| | | | |
|---|---|---|---|
| JP | 2017-3541 | A | 1/2017 |
| JP | 2018-72288 | A | 5/2018 |
| JP | 2019-160086 | A | 9/2019 |
| JP | 2019-219291 | A | 12/2019 |
| JP | 6684244 | B2 | 4/2020 |
| JP | 2020-107021 | A | 7/2020 |
| JP | 2021-15340 | A | 2/2021 |
| WO | WO 2015/068249 | A1 | 5/2015 |

OTHER PUBLICATIONS

International Search Report (PCT/ISA/210) issued in PCT Application No. PCT/JP2022/013333 dated May 31, 2022 with English translation (6 pages).
Japanese-language Written Opinion (PCT/ISA/237) issued in PCT Application No. PCT/JP2022/013333 dated May 31, 2022 with English translation (7 pages).
Extended European Search Report issued in European Application No. 22787954.1 dated Feb. 3, 2025 (9 pages).
Office Action issued in Canadian Application No. 3,209,670 dated Aug. 28, 2025 (5 pages).

| AREA ID | AREA COORDINATES | ATTRIBUTE |
|---|---|---|
| 1 | X1_1,Y1_1,...,Xn_1,Yn_1 | Loading |
| 2 | X1_2,Y1_2,...,Xn_2,Yn_2 | Dumping |
| 3 | X1_3,Y1_3,...,Xn_3,Yn_3 | Parking |
| ... | ... | ... |

FIG.5

| VEHICLE ID | TRAVELLING ROUTE |
|---|---|
| vehicle_1 | node_LP~node_DP |
| vehicle_2 | node_LP~node_DP |
| ... | ... |
| ... | ... |
| ... | ... |
| vehicle_m | node_DP~node_LP |
| vehicle_m+1 | node_DP~node_LP |

FIG.6

| NODE ID | TRAVELLING-PERMITTED VEHICLE |
|---|---|
| node1 | vehicle_1 |
| node2 | vehicle_1 |
| node3 | null |
| ... | ... |
| node_n | vehicle_2 |
| node_n+1 | vehicle_3 |
| node_n+2 | null |

| AREA TYPE | ID | SET TIME |
|---|---|---|
| LOADING AREA | 1 | 60 [s] |
| DUMPING AREA | 2 | 60 [s] |
| INTERSECTION AREA | 4 | 30 [s] |
| OTHER AREAS | - | 10 [s] |

| AREA TYPE | MACHINE TYPE | WORK STATE | SET TIME |
|---|---|---|---|
| LOADING AREA | EXCAVATOR | EXCAVATION/ LOADING | 60 [s] |
| | | OTHERS | 10 [s] |
| | DOZER | EARTH REMOVAL | 30 [s] |
| | | OTHERS | 10 [s] |
| | NOTHING | - | 10 [s] |

HAULING VEHICLE AND HAULING SYSTEM

TECHNICAL FIELD

The present invention relates to a hauling vehicle that autonomously executes operations such as travelling and dumping at a mine or the like and a hauling system.

BACKGROUND ART

A hauling vehicle such as a dump truck on which a distance meter that measures the distance to an obstacle in the LiDAR (Light Detection And Ranging) or the like is equipped with a system that detects dirt of an objective surface of the distance meter in some cases (patent documents 1 and 2 and so forth).

In recent years, hauling vehicles that autonomously operate in an unattended manner have been actively working at mines and so forth. In such an unattended hauling vehicle, when dirt of an objective surface of a distance meter is presumed, the distance to an obstacle is not correctly measured and thus processing of stopping operation and notifying a terminal of a management station of an alarm to request maintenance is executed in some cases. When the objective surface of the distance meter is dirty, cleaning work of the distance meter by a human is required to restore the normal ranging function. When a notification of the alarm is made, a worker heads out, by an automobile or the like, to the place of the hauling vehicle of the target that has stopped and the worker determines whether or not cleaning of the distance meter is necessary by a visual check of the dirt status. When determining that cleaning of the distance meter is necessary, the worker rides in the hauling vehicle and manually drives the hauling vehicle to cause the hauling vehicle to leave a train of vehicles. Then, the worker cleans the distance meter in a predetermined maintenance area and then returns the hauling vehicle to the train of vehicles and causes the hauling vehicle to resume autonomous operation.

PRIOR ART DOCUMENT

Patent Documents

Patent Document 1: JP-2017-3541-A
Patent Document 2: JP-6684244-B

SUMMARY OF THE INVENTION

Problem to be Solved by the Invention

However, in the system that detects dirt of the objective surface of the distance meter, floating earth dust or the like is detected and it is determined that the objective surface of the distance meter is dirty and an alarm is notified to the management station in some cases. The alarm attributed to such false detection forces the worker to head out and extends the stop time of the hauling vehicle beyond necessity to lower the operating rate of the hauling vehicle. Particularly in a mine, a large number of unattended hauling vehicles make a train of vehicles and autonomously operate in general. Therefore, when one hauling vehicle stops, other hauling vehicles also stop, which lowers the productivity of the whole of the work site.

An object of the present invention is to provide a hauling vehicle and a hauling system that can suppress the lowering of the operating rate due to false detection of dirt of a distance meter.

Means for Solving the Problem

In order to achieve the above-described object, the present invention provides a hauling vehicle including a vehicle body, a distance meter that measures the distance to an obstacle, a position sensor that acquires position data of the vehicle body, an in-vehicle controller that controls the vehicle body on the basis of an output of the position sensor, and a communication device that communicates with a management controller that manages the vehicle body. In the hauling vehicle, the in-vehicle controller is configured to execute primary determination of whether or not the distance meter is in a dirt-presumed state in which dirt of an objective surface of the distance meter is presumed on the basis of an output of the distance meter, command the vehicle body to stop at a current position when determining that the distance meter is in the dirt-presumed state in the primary determination, execute secondary determination of whether or not the distance meter is in the dirt-presumed state on the basis of the output of the distance meter after the elapse of a set time from the execution of the primary determination, transmit an alarm to the management controller through the communication device when determining that the distance meter is in the dirt-presumed state in the secondary determination, and command the vehicle body to resume travelling of the vehicle body when determining that the dirt-presumed state has been eliminated in the secondary determination.

Advantages of the Invention

According to the present invention, the lowering of the operating rate of the hauling vehicle due to false detection of dirt of the distance meter can be suppressed.

BRIEF DESCRIPTION OF THE DRAWINGS

FIG. 5 is a diagram representing an example of a data table of vehicle assignment management data.

FIG. 6 is a diagram representing an example of a data table of traffic control data.

MODES FOR CARRYING OUT THE INVENTION

Embodiments of the present invention will be described below with use of the drawings.

First Embodiment

—Hauling System—

Figure 1:
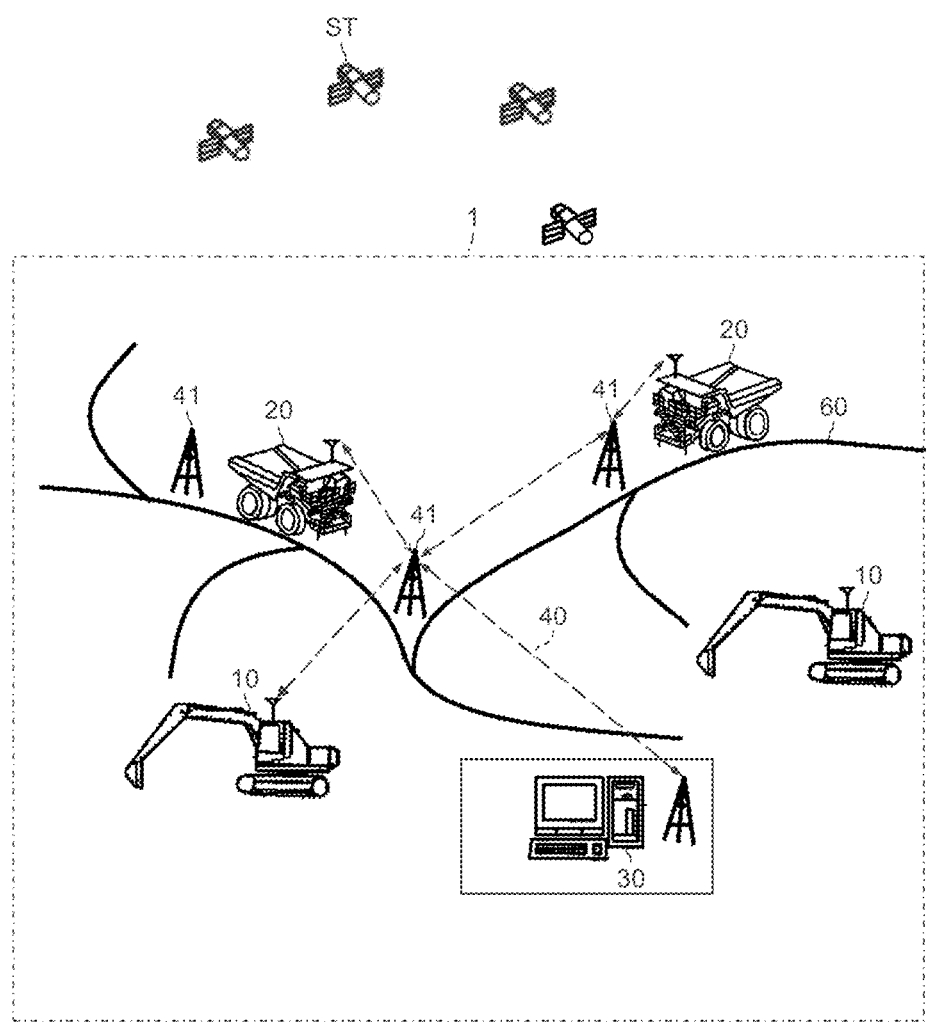
FIG. 1 is a schematic diagram of a hauling system according to a first embodiment of the present invention.

FIG. 1 is a schematic diagram of a hauling system according to a first embodiment of the present invention. A hauling system 1 illustrated in this diagram is a system used for hauling of earth and sand, ore, and so forth (hereinafter, abbreviated as earth and sand) at a work site of an open pit mine, for example. This hauling system 1 includes at least one hydraulic excavator 10, at least one dump truck 20, and a management controller 30.

The hydraulic excavator 10 is an example of a loading machine and executes work of excavation of earth and sand and loading of earth and sand onto the dump truck 20 in a predetermined loading area in the work site. The dump truck 20 is an example of a hauling vehicle and carries earth and sand loaded by the hydraulic excavator 10 and travels on a travelling route 60 to haul the earth and sand and dump it into a predetermined dumping area. Although not illustrated in FIG. 1, a bulldozer is disposed in the loading area or the dumping area and the ground of a place at which excavation work by the hydraulic excavator 10 or dumping work by the dump truck 20 has been executed is leveled by the bulldozer.

The hydraulic excavator 10, the dump truck 20, and the management controller 30 are connected with each other bidirectionally communicably by radio communication lines 40. In the example of this diagram, at least one radio base station 41 is installed in the work site, and the hydraulic excavator 10, the dump truck 20, and the management controller 30 transmit and receive data to and from each other through the radio base station 41.

In the present embodiment, a so-called travelling permission zone control system is used as a traffic control system by the management controller 30. The travelling permission zone control system is a control system in which travelling permission of each zone of the travelling route 60 divided by nodes on map data is not given to a plurality of dump trucks 20 simultaneously. Under this control system, travelling permission of each zone is always given to at most one dump truck 20 exclusively. For example, when travelling permission of a next zone b is requested from a dump truck A that is travelling in a zone a, the management controller 30 does not give travelling permission of the zone b to the dump truck A while travelling permission of the zone b is given to another dump truck B. Further, also when the zone b is set as an entry-prohibited zone, the management controller 30 does not respond to a request for travelling permission of the zone b from the dump truck A and does not permit the dump truck A to travel in the zone a. Therefore, the dump truck A once stops at the termination end of the zone a regarding which travelling permission is currently given by autonomous operation and waits until travelling permission of the next zone b is given.

Figure 2:
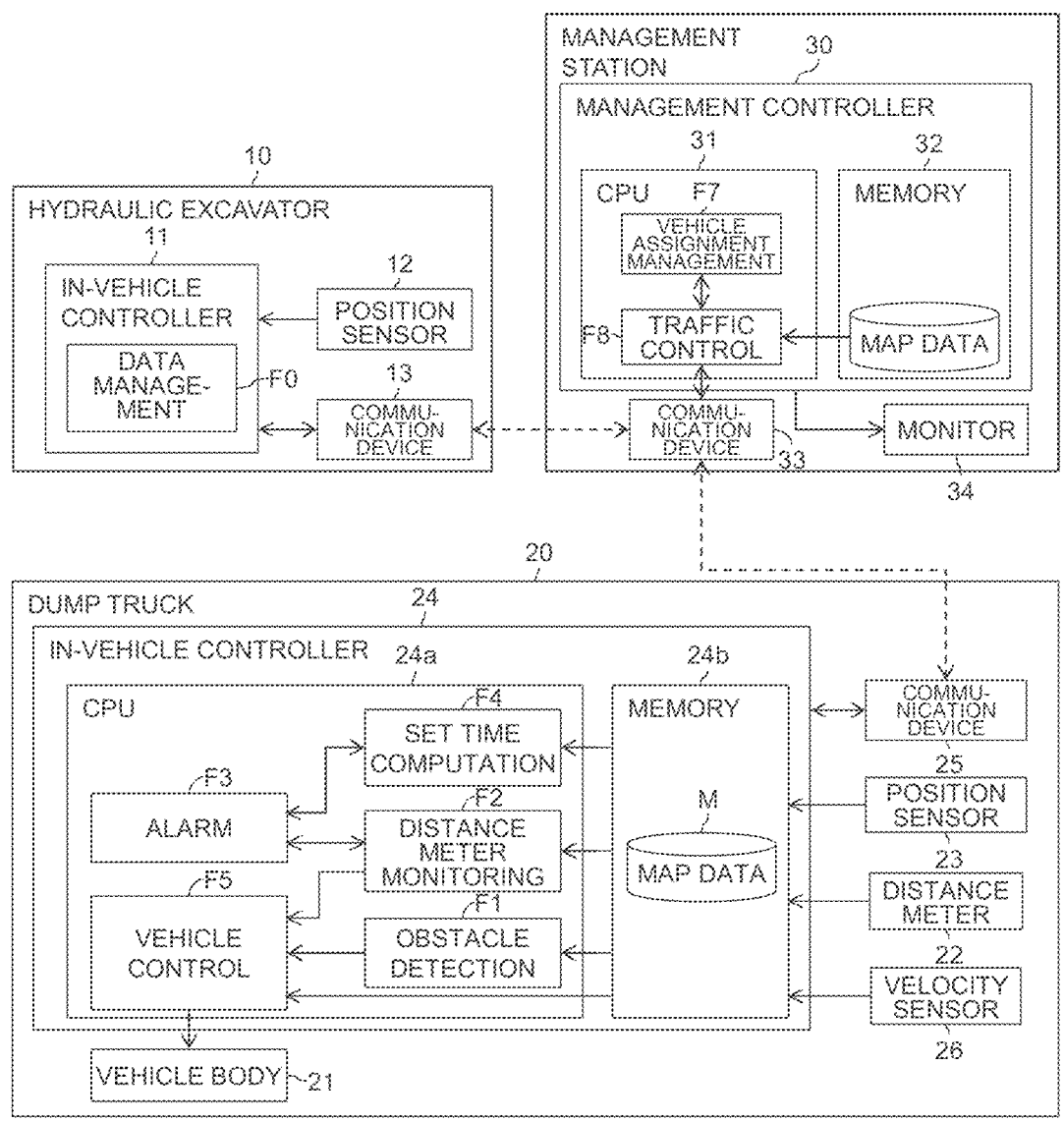
FIG. 2 is a functional block diagram of the hauling system according to the first embodiment of the present invention.

FIG. 2 is a functional block diagram of the hauling system 1. In this diagram, one hydraulic excavator 10 and one dump truck 20 are illustrated. However, also when a plurality of hydraulic excavators 10 and a plurality of dump trucks 20 are included in the system, each hydraulic excavator 10 and each dump truck 20 are a similar configuration.

Next, the hydraulic excavator 10, the dump truck 20, and the management controller 30 will be sequentially described.

—Hydraulic Excavator—

The hydraulic excavator 10 includes a front work implement in which a bucket is mounted on a work arm that is configured to include a boom and an arm and has an articulated structure. The hydraulic excavator 10 includes an in-vehicle controller 11, a position sensor 12, and a communication device 13.

The position sensor 12 is a receiver of a GNSS (Global Navigation Satellite System), for example, and outputs data of an antenna position received from an artificial satellite ST (FIG. 1) to the in-vehicle controller 11.

The communication device 13 is a radio device that is connected to the radio communication line 40. This communication device 13 executes transmission and reception of data with the dump truck 20 and the management controller 30 through the radio communication line 40.

The in-vehicle controller 11 is a computer including a computing device such as a CPU and a memory such as RAM and ROM and executes a program stored in the memory by the CPU to control operation of the hydraulic excavator 10. The in-vehicle controller 11 is equipped with a data management function F0. In the data management function F0, a function of computing position data of the hydraulic excavator 10 (self-machine) on the basis of received data of the position sensor 12 as needed and transmitting the position data of the hydraulic excavator 10 to the management controller 30 through the communication device 13 in real time or at a predetermined time interval is included.

The position data of the hydraulic excavator 10 computed by the data management function F0 is position data of the global coordinate system (coordinate system uniquely defined is also available) computed based on the antenna position input from the position sensor 12 in real time. This position data is position data of a reference point (for example, the center of gravity of the machine body) of the hydraulic excavator 10, and can be calculated from the antenna position and known data of machine body dimensions also when a position other than the antenna position is set as the reference point. In this case, orientation data of the hydraulic excavator 10 can be obtained from position data of two antennas for GNSS as in the dump truck 20 illustrated in FIG. 3.

—Dump Truck—

Figures 3, 4:
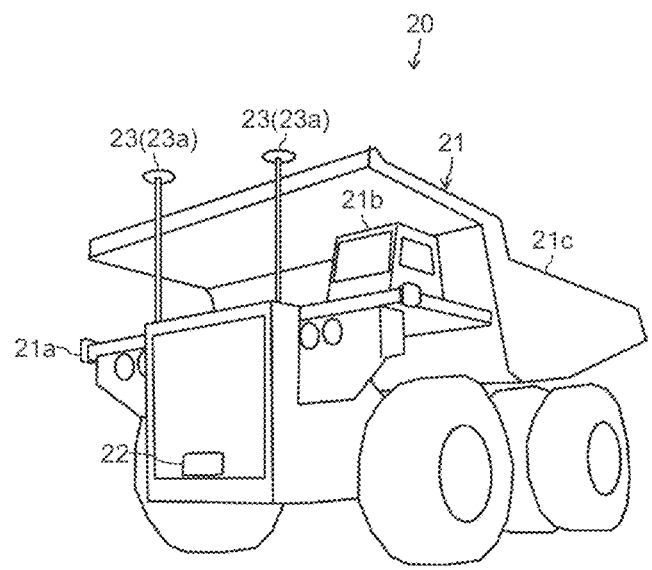
FIG. 3 is a perspective view schematically representing the appearance of a dump truck that belongs to the hauling system according to the first embodiment of the present invention.
FIG. 4 is a diagram representing an example of a data table of area data.

FIG. 3 is a perspective view schematically representing the appearance of the dump truck 20. The dump truck 20 includes a vehicle body 21, a distance meter 22, a position sensor 23, an in-vehicle controller 24 (FIG. 2), and a communication device 25 (FIG. 2).

The vehicle body 21 includes a chassis 21a having left and right front wheels and left and right rear wheels, a cab 21b mounted on a front part of the chassis 21a, and a vessel (body) 21c mounted on a rear part of the chassis 21a. The dump truck 20 can carry a load such as earth and sand in the vessel 21c and travel by the chassis 21a, and discharge (dump) the load by causing the vessel 21c to rise up with such an inclination that the rear side is lower. The dump truck 20 is an unattended automobile and autonomously operates through being controlled by the in-vehicle controller 24 on the basis of data input from the management controller 30 and position data acquired by the position sensor 23. However, it is also possible that a worker rides in the cab 21b and manually drives the dump truck 20. The velocity of the vehicle body 21 (vehicle velocity) is measured by a velocity sensor 26 and is output to the in-vehicle controller 24.

The distance meter 22 is a sensor that measures the distance to an obstacle located on the front side of the vehicle body 21. In the present embodiment, the dump truck 20 includes the 3D-LiDAR (Light Detection and Ranging) that measures the distance to an obstacle by using laser light as the distance meter 22. However, 2D-LiDAR, stereo camera, millimeter-wave radar, laser radar, ultrasonic sensor, monocular camera, and so forth can also be employed as the distance meter 22. The distance meter 22 is disposed at a comparatively low position in a front part of the vehicle body 21 such that an obstacle on the ground surface can be sensed with high sensitivity, and is disposed at a position lower than the highest part in the front wheels in the configuration exemplified in FIG. 3.

The position sensor 23 is a receiver of a GNSS (Global Navigation Satellite System), for example. This position sensor 23 outputs position data of the dump truck 20 (antennas 23a disposed on the dump truck 20) received from the artificial satellite ST (FIG. 1) to the in-vehicle controller 24 in real time.

The communication device 25 is a radio device that is connected to the radio communication line 40 (FIG. 1). The communication device 13 executes transmission and reception of data with a controller outside the vehicle such as the in-vehicle controller 11 of the dump truck 20 or the management controller 30 through the radio communication line 40.

—In-Vehicle Controller of Dump Truck—

The in-vehicle controller 24 (FIG. 2) is a computer including a CPU (computing device) 24a and a memory 24b such as RAM and ROM, and executes a program stored in the memory 24b by the CPU 24a to control operation of the dump truck 20.

In the memory 24b, an OS (Operating System), various control programs, and various kinds of data are stored. Further, in the memory 24b, outputs (values obtained through AD conversion according to need) of the position sensor 23, the distance meter 22, and the velocity sensor 26 and data input from the management controller 30 through the communication device 25 are stored. Besides, map data M that represents the respective spots in the work site by coordinates is also stored in the memory 24b in advance.

The CPU 24a executes a function of causing the dump truck 20 to autonomously operate in accordance with the program stored in the memory 24b. Specifically, a function of controlling, based on the output of the position sensor 23, the vehicle body 21 to keep the vehicle body 21 from deviating from the zone in which travelling is permitted and a function of causing the vehicle body 21 to travel or stop to keep the vehicle body 21 from interfering with an obstacle sensed by the position sensor 23 are executed by the CPU 24a.

Besides, as described in detail later, in accordance with the program stored in the memory 24b, the CPU 24a executes a function of determining dirt of an objective surface of the distance meter 22 and notifying the management controller 30 of an alarm to request cleaning when the distance meter 22 is in the state in which cleaning is necessary. The objective surface of the distance meter 22 is the outermost surface of the distance meter 22 to and from which an inspection wave for measuring the distance to an obstacle goes in and out. For example, in the case of the LiDAR, the objective surface is the outer surface of the foremost glass plate to and from which laser light goes in and out.

In the process of outputting the alarm to request cleaning of the distance meter 22, in the present embodiment, when dirt of the objective surface of the distance meter 22 is presumed, this is deemed as provisional primary determination and the vehicle body 21 is stopped at the current position. However, transmission of the alarm is held at this timing. Secondary determination is executed about dirt of the distance meter 22 after a set time has passed from the primary determination by which the dirt-presumed state is made. When dirt of the objective surface of the distance meter 22 is presumed also in the secondary determination and it is presumed that the distance meter 22 is actually dirty, the alarm is notified to the management controller 30 first at this stage. Even when the primary determination that the distance meter 22 is in the dirt-presumed state has been made, autonomous operation is permitted and travelling of the vehicle body 21 is resumed if the dirt-presumed state has been eliminated at the time of the secondary determination.

Although illustration is omitted in FIG. 2, the dump truck 20 is equipped with a function of computing position data of a reference point (for example, the center of gravity of the vehicle body) of the dump truck 20 (self-vehicle) in real time by the CPU 24a on the basis of input data from the position sensor 23. The computed position data of the reference point is transmitted to the management controller 30 through the communication device 25 in real time. The position data of the reference point of the hydraulic excavator 10 computed by the in-vehicle controller 24 is position data of the global coordinate system (coordinate system uniquely defined is also available). The position data can be calculated from the antenna position and known data of vehicle body dimensions also when a position other than the antenna position is set as the reference point. In this case, orientation data of the dump truck 20 can be obtained from position data of the two antennas 23a for GNSS illustrated in FIG. 3.

—Functions of in-Vehicle Controller of Dump Truck—

In functions executed by the CPU 24*a*, an obstacle detection function F1, a distance meter monitoring function F2, an alarm function F3, a set time computation function F4, and a vehicle control function F5 are included. These functions cooperate as appropriate in autonomous operation of the dump truck 20.

First, the obstacle detection function F1 is a function of, based on output data of the distance meter 22, sensing an obstacle involving a possibility of collision with the self-vehicle (dump truck 20 on which this distance meter 22 is mounted).

The distance meter monitoring function F2 is a function of presuming dirt of the objective surface of the distance meter 22 on the basis of output data of the distance meter 22. Regarding the distance meter monitoring function F2, a specific example will be described later with use of FIG. 7.

The alarm function F3 is a function of generating an alarm to request cleaning of the objective surface of the distance meter 22 on the basis of a determination value by the distance meter monitoring function F2 and a set time computed by the set time computation function F4, and transmitting the alarm to the management controller 30 through the communication device 25. Regarding the alarm function F3, a specific example will be described later with use of FIG. 8.

The set time computation function F4 is a function of computing the set time from presumption of dirt of the objective surface of the distance meter 22 by the distance meter monitoring function F2 (primary determination) to recheck of whether the distance meter 22 is actually dirty in the alarm function F3 (secondary determination). Regarding the set time computation function F4, a specific example will be described later with use of FIG. 9 and FIG. 10.

The vehicle control function F5 is a function of executing and stopping autonomous operation of the dump truck 20 according to the determination value by the distance meter monitoring function F2. The vehicle body 21 autonomously operates by a control signal generated by the vehicle control function F5. The output target of the control signal is the respective drive devices mounted on the vehicle body 21 and is a steering motor for changing the steering angle of the dump truck 20, a travelling motor for causing the dump truck 20 to travel, a brake for braking, a hydraulic circuit that drives the vessel 21*c*, and so forth. Regarding determination of whether to permit or prohibit autonomous operation of the dump truck 20 in the vehicle control function F5, a specific example will be described later with use of FIG. 11.

—Management Controller—

The management controller 30 is a computer that executes vehicle assignment management and traffic control of the dump truck 20 and is installed in a building of a management station that manages the hydraulic excavator 10 and the dump truck 20. The management station is built in the work site (open pit mine) or the like. In some cases, the management station is built outside the work site and is connected to an office (not illustrated) in the work site or the base station 41 (FIG. 1) through the radio communication line 40 (FIG. 1) or a network such as the Internet.

The management controller 30 includes a CPU 31 and a memory 32. The CPU 31 and the memory 32 are hardware similar to the CPU 24*a* and the memory 24*b* of the in-vehicle controller 24 of the dump truck 20. A communication device 33 and a monitor 34 are connected to the management controller 30. The communication device 33 is a radio device that is connected to the radio communication line 40 (FIG. 1). The communication device 33 executes transmission and reception of data with the in-vehicle controllers 24 and 11 of the dump truck 20 and the hydraulic excavator 10 through the radio communication line 40. The monitor 34 is one example of an output device. For example, it is also possible to use the monitor 34 in combination with other kinds of output devices such as a printer and a speaker or substitute the monitor 34 with these other kinds of output devices.

Various programs and map data are stored in the memory 32 as with the memory 24*b* of the dump truck 20. Besides, vehicle assignment management data and traffic control data computed by the CPU 31 are stored in the memory 32. Further, area data of an excavation area, a dumping area, a parking area, and so forth in the work site is also stored in the memory 32 in a data table format, for example (FIG. 4). In a data table of the area data exemplified in FIG. 4, coordinates of a point sequence that marks out an area (area coordinates) and the attribute (loading, dumping, parking, and so forth) are registered regarding each area ID in the work site.

The CPU 24*a* executes predetermined functions including a vehicle assignment management function F7 and a traffic control function F8 in accordance with the program stored in the memory 32.

The vehicle assignment management function F7 is a function of setting a travelling route to the next destination regarding each dump truck 20. For example, when the certain dump truck A is located in the loading area, a travelling route to the dumping area that is the next destination is set in the vehicle assignment management function F7. When the dump truck A has reached the dumping area, a travelling route to the loading area that is the next destination is set in the vehicle assignment management function F7. The travelling routes set by the vehicle assignment management function F7 are stored in the memory 32 as the vehicle assignment management data in a format of a table like one illustrated in FIG. 5, for example In the data table of the vehicle assignment management data exemplified in FIG. 5, travelling routes set by the vehicle assignment management function F7 are each registered regarding each vehicle ID of the dump truck 20. In the example of this diagram, a travelling route from a loading position node_LP to a dumping position node_DP or a travelling route from the dumping position node_DP to the loading position node_LP is set regarding each dump truck 20. All travelling routes are defined as a coordinate point sequence (node sequence) for allowing the dump truck 20 to follow it as a target trajectory. At this time, data of a travelling-prohibited area in the work site is included in the map data stored in the memory 32 and the travelling route is set with avoidance of the travelling-prohibited area in the vehicle assignment management function F7.

The traffic control function F8 gives travelling permission to at most one dump truck 20 regarding each zone arising from segmentation of a travelling route into a plurality of zones on the basis of the traffic control data stored in the memory 32 to keep travelling permission from being given to a plurality of dump trucks 20 simultaneously regarding the same zone.

FIG. 6 is a diagram representing an example of a data table of the traffic control data. In the data table of the traffic control data illustrated in this diagram, a node ID of each zone and an ID of the dump truck 20 currently given travelling permission regarding each zone are registered. For example, when the certain dump truck A is travelling in the certain zone a on a travelling route, the traffic control function F8 gives travelling permission to the dump truck A regarding the next zone b if another dump truck is not travelling in the next zone b. If travelling permission is given to another dump truck regarding the next zone b, travelling permission of the next zone b is not given to the dump truck A under the traffic control function F8. In this case, the dump truck A stops so as not to cross over the termination node of the zone a regarding which the dump truck A is currently permitted to travel, and waits until travelling permission of the next zone b is given. Each dump truck 20 travels in accordance with the node of a zone set as above.

—Distance Meter Monitoring Function—

Figure 7:
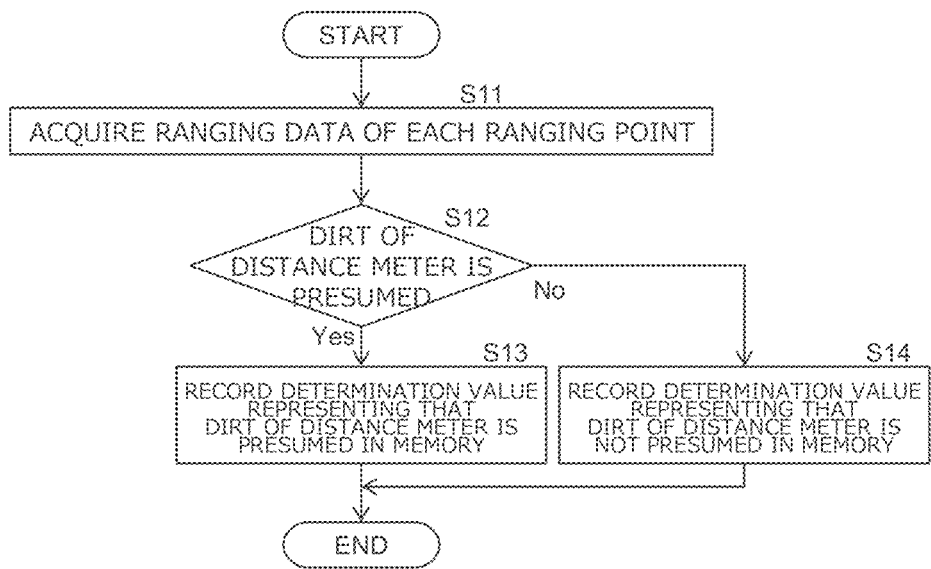
FIG. 7 is a flowchart representing the processing procedure of a distance meter monitoring function.

FIG. 7 is a flowchart representing the processing procedure of the distance meter monitoring function F2. While being powered on, the in-vehicle controller 24 of the dump truck 20 repeatedly executes the flow of FIG. 7 by the CPU 24a with a short cycle time (for example, 0.1 s). Due to this, whether or not the distance meter 22 is in the dirt-presumed state in which dirt of the objective surface of the distance meter 22 is presumed is determined in real time on the basis of the output of the distance meter 22.

Specifically, upon starting the flow of FIG. 7, the CPU 24a first reads in, in real time, from the memory 24b, ranging data (latest data) of each ranging point in a ranging field of view input from the 3D-LiDAR that is the distance meter 22 to the in-vehicle controller 24 as needed (step S11).

Next, the CPU 24a determines whether the distance meter 22 is in the dirt-presumed state in which dirt of the objective surface of the distance meter 22 is presumed, on the basis of the ranging data of each ranging point read in in the step S11 (step S12). In this example, the ranging data is compared with a threshold set in advance and the CPU 24a determines that the distance meter 22 is in the dirt-presumed state when the ranging data is smaller than the threshold at a predetermined number (for example, number of about 5%) or more of ranging points in all ranging points. The threshold set about the ranging data is set larger by a predetermined margin with respect to the distance from the light receiving surface of laser light in the distance meter 22 to the objective surface, for example. The ranging data of soil dust that adheres to the objective surface is possibly smaller than the threshold. Besides, the ranging data of soil dust or the like that floats at very close range from the objective surface is also possibly smaller than the threshold.

When determining that the distance meter 22 is in the dirt-presumed state as the result of the determination in the step S12, the CPU 24a records a determination value representing that the distance meter 22 is in the dirt-presumed state in the memory 24b together with data of the current clock time (step S13). The determination value recorded in the memory 24b in the step S13 is not particularly limited and can be set to "1," for example.

When determining that dirt of the objective surface of the distance meter 22 is not presumed as the result of the determination in the step S12, the CPU 24a records a determination value representing that the objective surface of the distance meter 22 is not dirty in the memory 24b together with clock time data (step S14). The determination value recorded in the memory 24b in the step S14 is not particularly limited and can be set to "0," for example.

When having executed the procedure of the step S13 or the step S14, the CPU 24a ends one cycle of the flow of FIG. 7. By repeatedly executing the procedure of the above one cycle, whether the objective surface of the distance meter 22 is in a dirty state or in a clean state is estimated in real time while the in-vehicle controller 24 is energized. For example, the determination value changes from 0 to 1 when soil dust adheres to the objective surface of the distance meter 22 in a clean state by a predetermined area or more or the field of view of the distance meter 22 is blocked by floating soil dust. Conversely, in the case in which the distance meter 22 is not dirty, even if dirt of the objective surface of the distance meter 22 is once presumed, the determination value returns from 1 to 0 when soil dust settles and the field of view of the distance meter 22 becomes clear, for example.

—Alarm Function—

Figure 8:
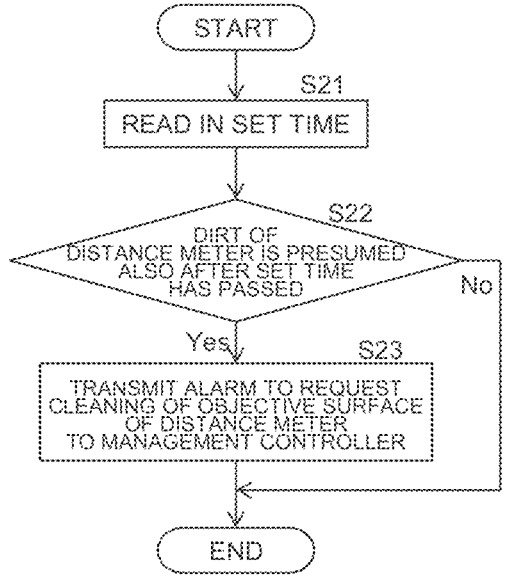
FIG. 8 is a flowchart representing the processing procedure of an alarm function.

FIG. 8 is a flowchart representing the processing procedure of the alarm function F3. While the in-vehicle controller 24 is powered on, the CPU 24a executes the flow of FIG. 8 upon recording the determination value 1 representing that the distance meter 22 is in the dirt-presumed state in the memory 24b in the step S13 in FIG. 7.

For example, when the determination value 1 is recorded in the step S13 in FIG. 7 at a clock time t1, the CPU 24a holds the determination of the clock time t1 executed in the step S12 in FIG. 7 and first reads in the set time computed by the set time computation function F4 from the memory 24b (step S21).

Next, at a clock time t2 after the set time from the clock time t1 has passed, the CPU 24a reads in the determination value recorded in the step S13 or S14 in FIG. 7 at the clock time t2 from the memory 24b. Then, the CPU 24a determines whether the determination value recorded at the clock time t2 is the value (for example, 1) with which dirt of the objective surface of the distance meter 22 is presumed (step S22). In this case, the determination of the step S12 executed at the clock time t1 is the primary determination and the determination of the step S12 executed at the clock time t2 is the secondary determination.

When dirt of the objective surface of the distance meter 22 is still presumed also at the clock time t2 as the result of the determination of the step S22, the CPU 24a records alarm data to request cleaning of the objective surface of the distance meter 22 in the memory 24b together with data of the current clock time. The CPU 24a transmits the alarm data recorded in the memory 24b from the in-vehicle controller 24 to the management controller 30 through the communication device 25 and ends the flow of FIG. 8 (step S23).

When the determination value of the clock time t2 has returned to 0 and the dirt-presumed state of the objective surface of the distance meter 22 has been eliminated as the result of the determination of the step S12, the CPU 24a ends the flow of FIG. 8 without recording the alarm data in the memory 24b.

—Set Time Computation Function—

Figures 9, 10:
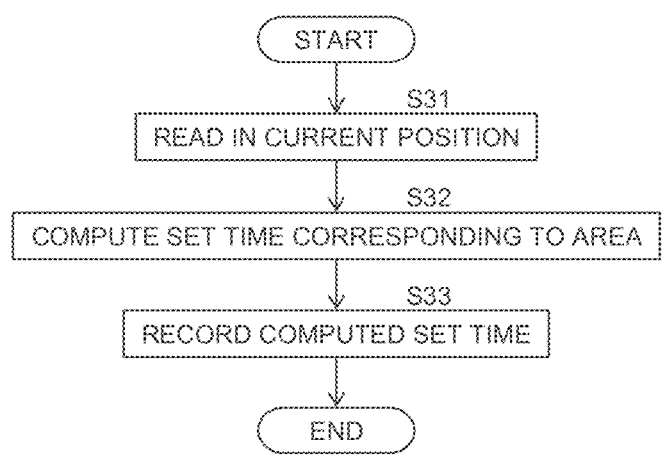
FIG. 9 is a flowchart representing the processing procedure of a set time computation function in the first embodiment of the present invention.
FIG. 10 is a diagram representing an example of a data table of a set time in the first embodiment of the present invention.

FIG. 9 is a flowchart representing the processing procedure of the set time computation function F4. While being powered on, the in-vehicle controller 24 of the dump truck 20 repeatedly executes the flow of FIG. 9 by the CPU 24a with a short cycle time (for example, 0.1 s) to compute the set time according to the current position of the dump truck 20 in real time. Alternatively, instead of being executed in real time (that is, always), the flow of FIG. 9 may be executed at the time of execution of the alarm function F3, that is, every time the determination value 1 representing that the distance meter 22 is in the dirt-presumed state is recorded in the memory 24b in the step S13 in FIG. 7.

Upon starting the flow of FIG. 9, the CPU 24a reads in current position data (latest output of the position sensor 23) of the dump truck 20 from the memory 24b (step S31). Then, the CPU 24a computes the set time according to the read-in current position (step S32) and records the computed set time in the memory 24b to end the flow of FIG. 9 (step S33).

Here, in the present embodiment, plural areas set along the travelling route of the vehicle body 21 and data of the set time set for each of these areas are stored in the memory 24b in advance in a format of a table data, for example. The areas are equivalent to the data exemplified in FIG. 4. In the step S32 in FIG. 9, the area in which the dump truck 20 (self-vehicle) is currently located is determined on the basis of position data of the vehicle body 21 and the set time corresponding to the area in which the dump truck 20 is currently located is computed on the basis of the data table (FIG. 10).

FIG. 10 is a diagram representing an example of the data table of the set time corresponding to the area. In the data table illustrated in the example of this diagram, dust generation areas that exist on the travelling route of the dump truck 20 and other areas excluding the dust generation areas are included. The dust generation areas are areas in which a large amount of soil dust frequently soars, such as a loading area (ID=1), a dumping area (ID=2), and an intersection area (ID=3). The dust generation areas defined in the data table in the present embodiment are fixed areas whose position is fixed (does not move). In the loading area, a large amount of soil dust frequently soars due to excavation/loading work of earth and sand by the hydraulic excavator 10 or earth removal work by a bulldozer (not illustrated). Also in the dumping area, a large amount of soil dust soars every time another dump truck 20 executes dumping work. Also in the intersection area, a large amount of soil dust possibly soars every time another dump truck 20 traverses the travelling route. The set time of these dust generation areas is set long compared with the set time of the other areas as illustrated in FIG. 10. In the example illustrated in this diagram, the set time of the loading area and the dumping area is set to 60 seconds. The set time of the intersection area is set to 30 seconds. The set time of the other areas is set to 10 seconds.

—Vehicle Control Function—

Figure 11:
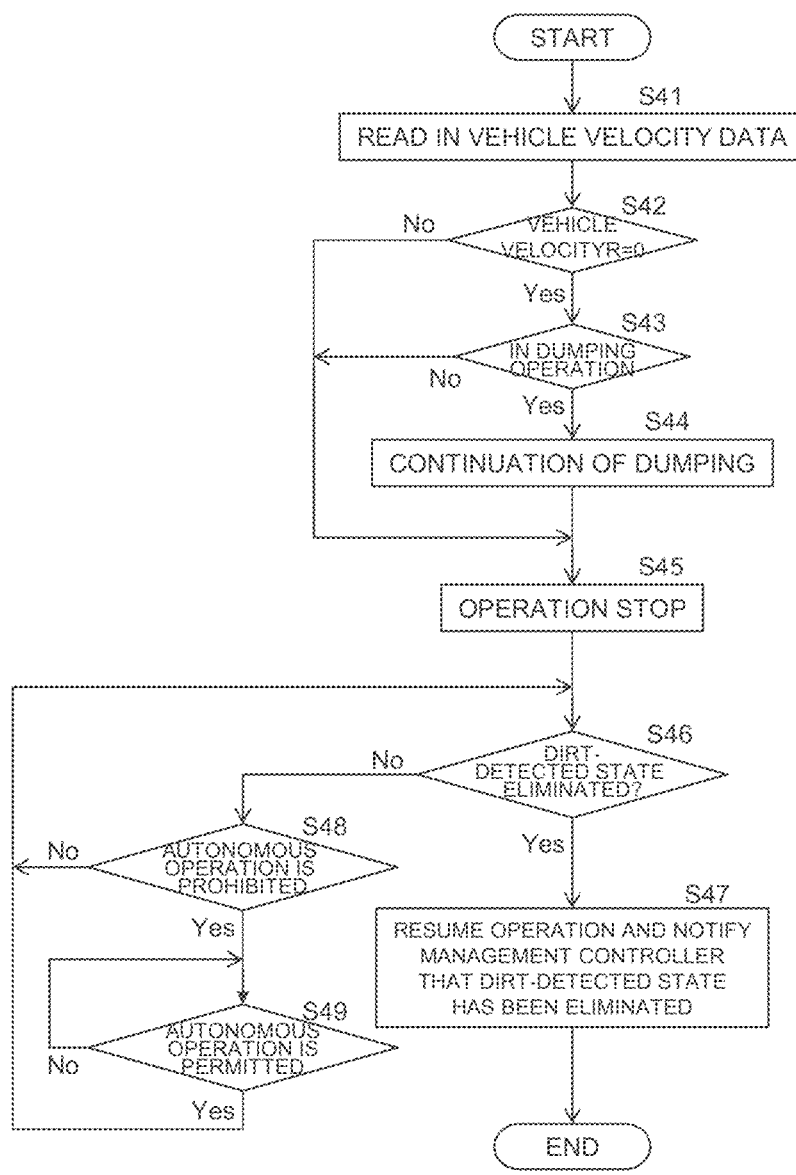
FIG. 11 is a flowchart representing the processing procedure of a vehicle control function.

FIG. 11 is a flowchart representing the processing procedure of the vehicle control function F5. While the in-vehicle controller 24 is powered on, in principle, the CPU 24a causes the vehicle body 21 to autonomously operate on the basis of the output of the position sensor 23, the output of the distance meter 22, the output of the velocity sensor 26, the map data M, and the traffic control data. However, the CPU 24a executes the flow of FIG. 11 when making the primary determination in which dirt of the distance meter 22 is presumed and recording the determination value representing that the distance meter 22 is in the dirt-presumed state in the memory 24b in the step S13 in FIG. 7.

Upon starting the flow of FIG. 11, the CPU 24a reads in, from the memory 24b, the current value (latest data) of vehicle velocity data of the dump truck 20 input from the velocity sensor 26 to the in-vehicle controller 24 (step S41) and determines whether the vehicle velocity is 0 (step S42). When the dump truck 20 is travelling and the vehicle velocity is higher than 0, the CPU 24a controls the vehicle body 21 to stop the operation of the dump truck 20 (step S45). When the dump truck 20 has stopped and the vehicle velocity is 0, the CPU 24a determines whether dumping work is being executed (step S43). When dumping work is being executed, the CPU 24a controls the vehicle body 21 to continue the dumping work (step S44) and shifts the procedure to the step S45 after the end of the dumping work to stop the operation of the dump truck 20. When dumping work is not being executed, the CPU 24a shifts the procedure from the step S43 to the step S45 to stop the operation of the dump truck 20.

Next, in the state in which the operation of the dump truck 20 is stopped, the CPU 24a reads in the latest determination value recorded in the memory 24b in the step S13 or S14 in FIG. 7 and determines whether the dirt-presumed state has been eliminated (step S46). Here, when the dirt-presumed state has been eliminated, the CPU 24a controls the vehicle body 21 to resume the autonomous operation of the dump truck 20 and end the flow of FIG. 11 (step S47). Moreover, in the step S47, the CPU 24a notifies the management controller 30 that the dirt-presumed state has been eliminated.

When the distance meter 22 is still in the dirt-presumed state in the step S46, the CPU 24a refers to the memory 24b and determines whether the autonomous operation of the dump truck 20 is prohibited (step S48). Prohibition and permission of the autonomous operation are given by a command from the management controller 30 (described later). When the autonomous operation is not prohibited, the CPU 24a returns the procedure to the step S46. Due to the return of the procedure to the step S46, the autonomous operation of the dump truck 20 automatically resumes when the dirt-presumed state is eliminated. Conversely, when the autonomous operation is prohibited at the time of the determination of the step S48, the CPU 24a shifts the procedure to the step S49 and waits until the autonomous operation is permitted. During this period, the dump truck 20 does not autonomously operate and, for example, the dump truck 20 does not start to move in the middle of cleaning of the distance meter 22, or the like. When the autonomous operation of the dump truck 20 is permitted by predetermined operation, the CPU 24a returns the procedure to the step S46 and the autonomous operation of the dump truck 20 automatically resumes if the dirt-presumed state has been eliminated.

To summarize main points of vehicle control of the dump truck 20 performed by the in-vehicle controller 24 described with FIG. 7 to FIG. 9 and FIG. 11, first, the primary determination of whether or not the distance meter 22 is in the dirt-presumed state in which dirt of the objective surface of the distance meter 22 is presumed is executed on the basis of the output of the distance meter 22 (step S12 in FIG. 7). When it is determined that the distance meter 22 is in the dirt-presumed state in this primary determination, the vehicle body 21 stops (step S45 in FIG. 11). Then, after the elapse of the set time from the execution of the primary determination, the secondary determination of whether or not the distance meter 22 is in the dirt-presumed state in which dirt of the objective surface is presumed is executed on the basis of the output of the distance meter 22 (step S22 in FIG. 8). It is not until the determination on the distance meter 22 being in the dirt-presumed state in this secondary determination that the alarm to request cleaning of the distance meter 22 is transmitted to the management controller 30 through the communication device 25 (step S23 in FIG. 8). When it is determined that the dirt-presumed state has been eliminated in the secondary determination, the vehicle body 21 automatically resumes travelling (step S47 in FIG. 11). However, dumping operation in which the dump truck 20 does not move is permitted even when it is determined that the distance meter 22 is in the dirt-presumed state in the primary determination, and the dumping operation is completed without being suspended (stopped) (step S44 in FIG. 11).

—Alarm Screen—

Figure 12:
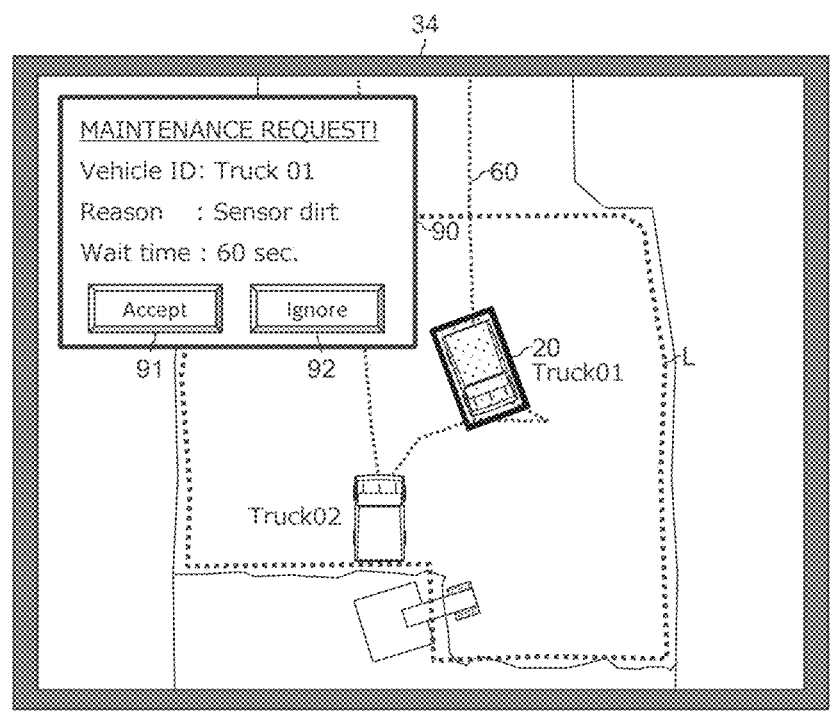
FIG. 12 is a diagram representing an example of an alarm screen displayed on a monitor by a management controller.

FIG. 12 is a diagram representing an example of an alarm screen displayed on the monitor 34 by the management controller 30. An alarm screen 90 illustrated in this diagram is a window displayed on a screen of the monitor 34 by the management controller 30 on the basis of the alarm data transmitted from the in-vehicle controller 24 in the step S23 in FIG. 8. In the monitor 34, the dump truck 20 (vehicle body of ID: "Truck01") regarding which it has been determined that the distance meter 22 is in the dirt-presumed state is highlighted on map graphics. An area surrounded by a dashed line L in this diagram represents the loading area (FIG. 10) and the set time from the primary determination to the secondary determination is set to 60 seconds in the example of FIG. 10.

In the alarm screen 90, a vehicle body ID of the dump truck 20 that is outputting the alarm (Vehicle ID), the reason of the alarm (Reason), and the vehicle stop time (Wait time) are displayed. The vehicle stop time is the elapsed time from vehicle stop to the current time and is counted up in association with the course of time. Furthermore, a first button 91 and a second button 92 are included in the alarm screen 90. The first button 91 is an icon operated in the case of responding to the request for cleaning of the distance meter 22. The second button 92 is an icon operated in the case of holding (waiting and seeing) the request for cleaning of the distance meter 22.

When the first button 91 is operated, to the in-vehicle controller 24 that has transmitted the alarm, a signal to prohibit autonomous operation of the dump truck 20 (self-vehicle) is transmitted from the management controller 30. While autonomous operation of the dump truck 20 is prohibited (while the step S49 in FIG. 11 is repeated), a worker heads out by an automobile or the like and causes the dump truck 20 to leave the travelling route 60 by, for example, manual driving and executes cleaning work of the distance meter 22. After the cleaning of the distance meter 22, the worker returns the dump truck 20 to the travelling route by manual driving and executes operation to permit autonomous operation as appropriate. This causes the dump truck 20 to resume the autonomous operation (steps S49, S46, and S47 in FIG. 11).

When the second button 92 is operated, the alarm screen 90 is once closed and timekeeping of a holding time (for example, 60 seconds) set in advance starts. If elimination of the dirt-presumed state is notified from the in-vehicle controller 24 during this holding time (step S47 in FIG. 11), redisplaying of the alarm screen 90 is canceled. If elimination of the dirt-presumed state is not notified, the alarm screen 90 is redisplayed after the elapse of the holding time.

—Processing of Management Controller—

Figure 13:
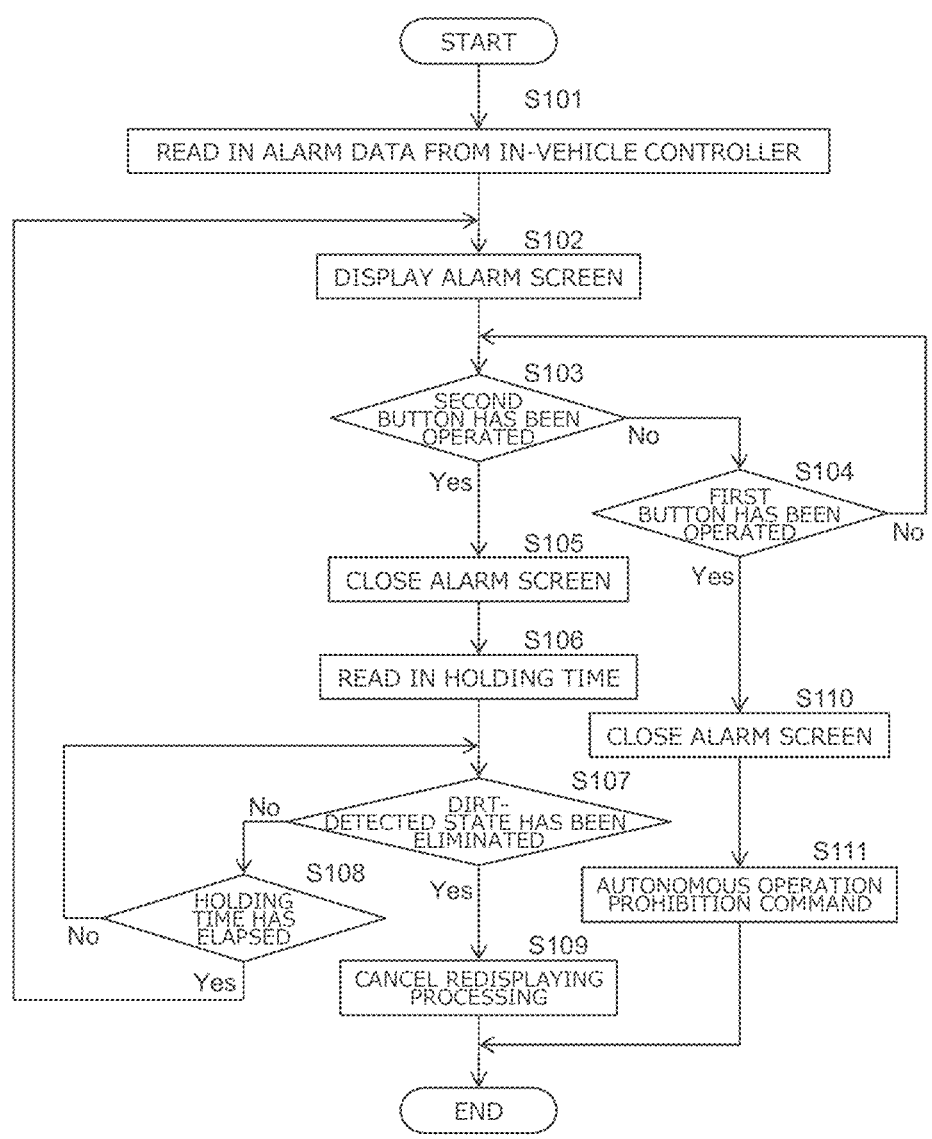
FIG. 13 is a flowchart representing the processing procedure of the management controller in the case in which an alarm is notified from an in-vehicle controller.

FIG. 13 is a flowchart representing the processing procedure of the management controller 30 in the case in which an alarm is notified from the in-vehicle controller 24. The flow of the management controller 30 illustrated in FIG. 13 is executed by the CPU 31 in accordance with a program stored in the memory 32 with input of the alarm data transmitted from the in-vehicle controller 24 in the step S23 in FIG. 8 being the trigger.

Upon starting the flow of FIG. 13, the CPU 31 reads in the alarm data received from the in-vehicle controller 24 from the memory 32 (step S101) and displays the alarm screen 90 (FIG. 12) on the monitor 34 on the basis of the read-in alarm data (step S102). Thereafter, the CPU 31 determines whether the first button 91 or the second button 92 in the alarm screen 90 has been operated (steps S103 and S104). When neither of the buttons has been operated, the CPU 31 repeats the procedure of the steps S103 and S104 while updating display of the vehicle stop time in the alarm screen 90.

When the second button 92 in the alarm screen 90 has been operated, the CPU 31 once closes the alarm screen 90 (step S105) and reads in the holding time set in advance from the memory 32 (step S106). Thereafter, the CPU 31 determines whether or not the dirt-presumed state has been eliminated on the basis of whether or not the notification output from the in-vehicle controller 24 in the step S47 in FIG. 11 is present (step S107). When the notification from the in-vehicle controller 24 is absent and the dirt-presumed state has not been eliminated, the CPU 31 determines whether the holding time has elapsed from the operation of the second button 92 (step S108). When the holding time has not elapsed, the CPU 31 returns the procedure from the step S108 to the step S107 and repeatedly determines whether the above-described dirt-presumed state continues for the holding time from the operation of the second button 92. When the dirt-presumed state continues even after the elapse of the holding time from the operation of the second button 92, the CPU 31 returns the procedure from the step S108 to the step S102 and redisplays the alarm screen 90 on the monitor 34.

When the dirt-presumed state has been eliminated during the period from the operation of the second button 92 to the elapse of the holding time, the CPU 31 cancels processing of redisplaying of the alarm screen 90 to end the flow of the FIG. 13 (step S109). The processing of redisplaying is a job of redisplaying of the alarm screen 90 after the elapse of the holding time, which is caused due to the operation of the second button 92 in the alarm screen. Therefore, when the dirt-presumed state has been eliminated during the holding time, the dump truck 20 resumes autonomous operation by itself and the alarm screen 90 is not displayed until an alarm is separately notified.

Furthermore, when the first button 91 in the alarm screen 90 has been operated, the CPU 31 closes the alarm screen 90 (step S110). In addition to this, the CPU 31 transmits a signal to prohibit autonomous operation to the in-vehicle controller 24 of the dump truck 20 that has transmitted the alarm data through the communication device 33 to end the flow of FIG. 13 (step S111). The procedures of the steps S110 and S111 may be reversed.

In the in-vehicle controller 24 that has received the signal transmitted in the step S111, this signal is recorded in the memory 24*b* and a reference to the signal is made at the time of determination of the step S48 in FIG. 11. The prohibition command of autonomous operation is deactivated through predetermined operation by a worker after cleaning of the distance meter 22 or the like (step S49 in FIG. 11).

—False Detection of Dirt of Distance Meter—

Figure 14:
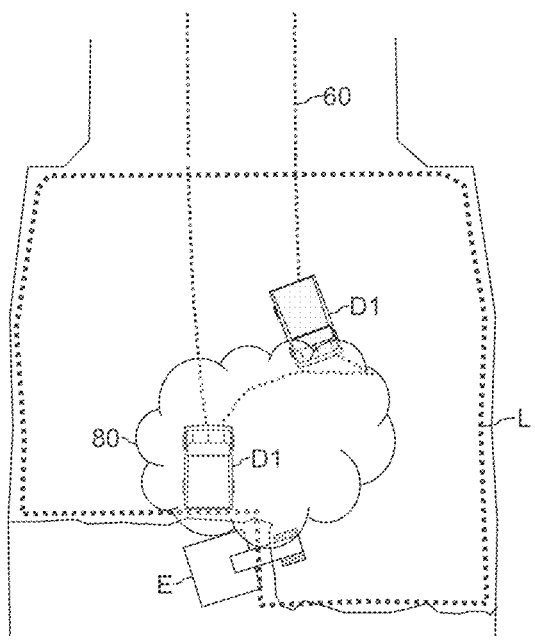
FIG. 14 is an explanatory diagram of the situation in which false detection of dirt of a distance meter occurs in a loading area.
Figure 15:
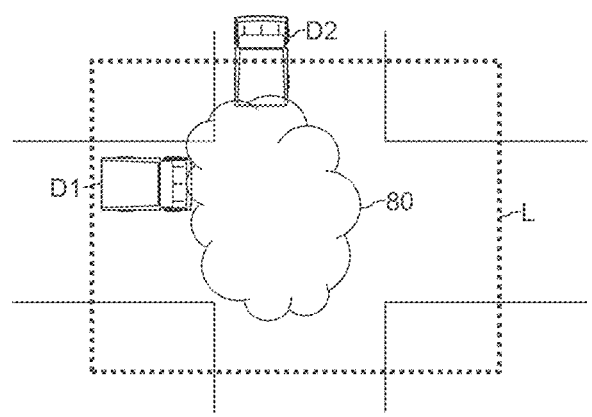
FIG. 15 is an explanatory diagram of the situation in which false detection of dirt of the distance meter occurs in an intersection area.

FIG. 14 is an explanatory diagram of the situation in which false detection of dirt of the distance meter occurs in the loading area. FIG. 15 is an explanatory diagram of the situation in which false detection of dirt of the distance meter occurs in the intersection area. In FIG. 14 and FIG. 15, the loading area and the intersection area are defined by a dashed line L. Moreover, in FIG. 14, two dump trucks D1 are indicated inside the loading area in order to represent the motion of the dump truck D1 on the travelling route 60 in the loading area. However, the two dump trucks D1 are not simultaneously located in the loading area actually. Similarly, also in FIG. 15, another dump truck D2 that has caused soil dust 80 generated in the intersection area is indicated for convenience. However, this does not express the state in which two dump trucks D1 and D2 have simultaneously entered the intersection area.

With a distance meter of a contactless type using electromagnetic waves or sound waves, when the field of view is poor due to soil dust, rain, fog, snow, or the like, possibly such soil dust or the like at very close range from the objective surface is subjected to ranging and it is determined that the soil dust or the like adheres to the objective surface although it does not adhere to the objective surface actually. For example, in the loading area in an open pit mine, a large amount of soil dust 80 is frequently generated in association with work of excavation of earth and sand or loading into the dump truck D2 by a large-size hydraulic excavator E as illustrated in FIG. 14, and false detection of dirt of the objective surface of the distance meter is liable to occur. As described above, the distance meter 22 is disposed at a comparatively low position, and therefore is susceptible to the influence of soil dust in some cases. This is the same also in the dumping area in which the large-size dump truck D1 executes dumping work and the intersection area (FIG. 15) in which the large-size dump truck D1 traverses the hauling route.

When dirt of the objective surface of the distance meter, which is an important factor for unattended operation, is notified, the dump truck D1 needs to be stopped and a worker needs to head out thereto, and the worker needs to visually check the state of dirt of the distance meter. A large number of dump trucks D1 travel on the same travelling route in the mine. Therefore, when one dump truck stops, the other dump trucks on the travelling route also all stop. Thus, the influence on the operating rate and the productivity is large if the dump truck frequently stops due to false detection of dirt of the distance meter.

—Effects—

(1) According to the present embodiment, when the dirt-presumed state in which dirt of the objective surface of the distance meter 22 is presumed is caused, the dump truck 20 on which the distance meter 22 is mounted stops but waits for the set time without immediately notifying the management controller 30 of an alarm. When an object subjected to ranging is not a thing that adheres to the objective surface of the distance meter 22 but floating soil dust, even when the dirt-presumed state is temporarily caused, possibly the field of view of the distance meter 22 becomes clear through waiting and seeing for the set time and the dirt-presumed state is eliminated. When the dirt-presumed state is eliminated, the dump truck 20 resumes autonomous operation by itself without demanding cleaning by the worker through notifying the management controller 30 of an alarm. Thus, the influence on the productivity of the whole mine and the operating rate of the dump truck 20 due to false detection of dirt of the distance meter 22 is also suppressed. Furthermore, when the dirt-presumed state is not eliminated even after the elapse of the set time from the vehicle stop, the possibility that the objective surface of the distance meter 22 is actually dirty is high. When it is presumed that the distance meter 22 is truly in a dirty state as above, it is possible to properly cope with this by demanding the worker. Due to enhancement in the validity of the request for a check by the worker, the opportunity of useless heading-out by the worker can be suppressed.

(2) Furthermore, even in the state in which dirt of the distance meter 22 is presumed, dumping work in which the position of the dump truck 20 does not change is permitted. As above, even when the dirt-presumed state is caused, by completing the dumping work without stopping various operations of the dump truck 20 with no exception, the dumping work can be finished by the time resumption of travelling is permitted. For example, in the case in which the vessel 21c in the middle of being raised is stopped and dumping work is suspended, and the dumping work is resumed when travelling is permitted, it is impossible to immediately travel although resumption of travelling is permitted. However, having finished the dumping work allows immediate resumption of travelling. This point also contributes to improvement in the operating rate and the productivity.

(3) Moreover, the set time from execution of the primary determination in which it is determined that the distance meter 22 is in the dirt-presumed state to execution of the secondary determination is set to a different value according to the position of the dump truck 20. For example, when the dump truck 20 stops in the dust generation area such as the loading area, the dumping area, or the intersection area due to the dirt-presumed state of the distance meter 22, the set time is long compared with the case in which the dump truck 20 stops in another area excluding the dust generation areas.

A large amount of soil dust is frequently generated in the dust generation area. Therefore, by setting the set time longer, waiting and seeing can be executed for an appropriate time period in which the large amount of soil dust settles, and prematurely notifying of an alarm although actually the objective surface of the distance meter 22 is not dirty can be suppressed. In contrast, by setting the set time shorter in the other areas in which scattering of a large amount of soil dust is not anticipated, the time taken until outputting of the alarm or resumption of autonomous operation of the dump truck 20 is suppressed.

(4) Furthermore, in the case of setting the dust generation areas whose position is fixed, such as the loading area, the dumping area, and the intersection area, the dust generation areas can be managed with the area coordinates of fixed points like those illustrated in FIG. 3. Thus, the area to which the vehicle stop position of the dump truck 20 belongs can be simply determined and computation of the set time can also be executed easily in association with this.

Second Embodiment

Figures 16, 17:
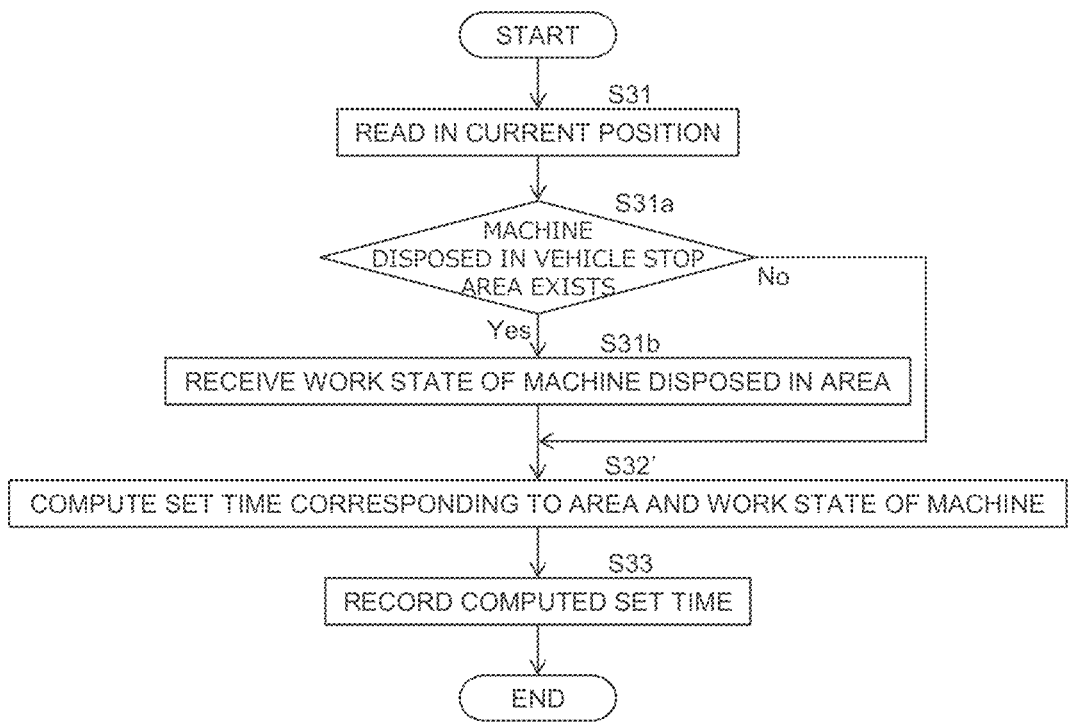
FIG. 16 is a diagram representing an example of a data table of the set time in a second embodiment of the present invention.
FIG. 17 is a flowchart representing the processing procedure of the set time computation function in the second embodiment of the present invention.

FIG. 16 is a diagram representing an example of a data table of the set time in a second embodiment of the present invention. FIG. 16 corresponds to FIG. 10 of the first embodiment.

The difference of the present embodiment from the first embodiment is that, even in the same dust generation area, the set time from the primary determination to the secondary determination is different depending on the work state of a machine disposed in the dust generation area. Specifically, in a data table of the set time stored in the memory 24b in the present embodiment, the set time different according to the work state of the disposed machine even in the same kind of dust generation area is set as exemplified in FIG. 16. When the primary determination that the distance meter 22 is in the dirt-presumed state is made and the dump truck 20 stops in the dust generation area, the in-vehicle controller 24 computes the set time according to the current work state of the machine that operates in the area.

The work state of the machine can be classified based on the actuation state of various actuators mounted on the machine and be determined based on the actuation state of the various actuators. The actuation state of the actuator can be determined based on outputs of various sensors that measure the action velocity and the action amount of the actuator, a control signal to the actuator, and so forth.

FIG. 16 is an example of the set time of the loading area. A hydraulic excavator and a bulldozer are assumed as the machine that operates in the loading area. When these machines are in the middle of executing predetermined work, the set time is set long compared with the case of the other work states. For example, the set time for the case in which the hydraulic excavator is executing excavation work or loading work, in which particularly a large amount of soil dust floats, is 60 seconds, whereas the set time for the other work states such as in stop and in travelling is as short as 10 seconds. Also regarding the bulldozer, the set time for earth removal work is 30 seconds, whereas the set time for the other work states is 10 seconds. Moreover, there is also the case in which the excavator and so forth are absent in the loading area due to maintenance or another reason, the set time corresponding to this case (in the example of this diagram, 10 seconds) is also set. Similarly to this, a data table in which the set time is set according to the work state of the disposed machine is stored in the memory 42b also regarding the dumping area and so forth.

FIG. 17 is a flowchart representing the processing procedure of the set time computation function F4 in the second embodiment of the present embodiment. FIG. 17 corresponds to FIG. 9 of the first embodiment. The procedure illustrated in FIG. 17 is repeatedly executed by the CPU 24a with a short cycle time (for example, 0.1 s) while the in-vehicle controller 24 is energized, similarly to the flow of FIG. 9 of the first embodiment. Due to this, the set time is computed in real time according to the current position of the dump truck 20. Alternatively, instead of being executed in real time (that is, always), the flow of FIG. 17 may be executed at the time of execution of the alarm function F3, that is, every time the determination value 1 representing that the distance meter 22 is in the dirt-presumed state is recorded in the memory 24b in the step S13 in FIG. 7. In the flow of FIG. 17, the procedures of the steps S31 and S33 are the same as the procedures of the steps S31 and S33 in FIG. 9.

Upon starting the flow of FIG. 17, the CPU 24a reads in current (latest) position data of the dump truck 20 from the memory 24b (step S31). Thereafter, the CPU 24a refers to the data table (for example, FIG. 16) of the set time corresponding to the current position and determines whether the current position is the dust generation area in which a machine such as the hydraulic excavator 10 that becomes a dust generation source is disposed (step S31a). When the vehicle stop position is the dust generation area in which a machine that becomes a dust generation source is disposed, the CPU 24a transmits a query signal to the management controller 30 and receives data of the current work state of the relevant machine that operates in the area of the current position from the management controller 30 (step S31b).

Upon receiving the data of the work state, the CPU 24a refers to the table of the set time according to the current position and computes the set time corresponding to the data of the work state of the relevant machine (step S32'). If the vehicle stop position is an area in which a machine that becomes a dust generation source is not disposed, the CPU 24a shifts the procedure from the step S31a to the step S32' and computes the set time on the basis of the data table corresponding to the current position similarly to the first embodiment. Upon computing the set time in the step S32' in this manner, the CPU 24a records the computed set time in the memory 24b to end the flow of FIG. 17 (step S33).

Regarding the contents of processing by the other controllers and the hardware configuration thereof, the present embodiment is similar to the first embodiment.

If a plurality of machines that become a dust generation source exist in the area in which the dump truck 20 has stopped, for example, data of the work state of these machines is received and the maximum value of values corresponding to the work state of the respective machines on the data table of the set time is computed as the set time.

Also in the present embodiment, effects similar to those of the first embodiment are obtained. In addition, in the case of the present embodiment, for example, even in the dust generation area such as the loading area, the timing of the secondary determination is made earlier when the machine that becomes a dust generation source, such as the hydraulic excavator 10 that operates therein, is not in predetermined work and it is estimated that the degree of dust generation is low. This can shorten the holding time of determination of whether to notify the management controller 30 of an alarm or to resume autonomous operation. Also in this point, the effect of suppression of lowering of the operating rate and the productivity can be expected.

Third Embodiment

In the second embodiment, when the primary determination that the distance meter 22 is in the dirt-presumed state is made and vehicle stop is caused, the vehicle stop position is applied to an area set with the position thereof fixed, and it is determined whether a machine that becomes a dust generation source exists in the area in which the vehicle is in stop. However, the setting method of the area can be changed in computing the set time with the work state of the machine that becomes a dust generation source being also taken into consideration.

Figure 18:
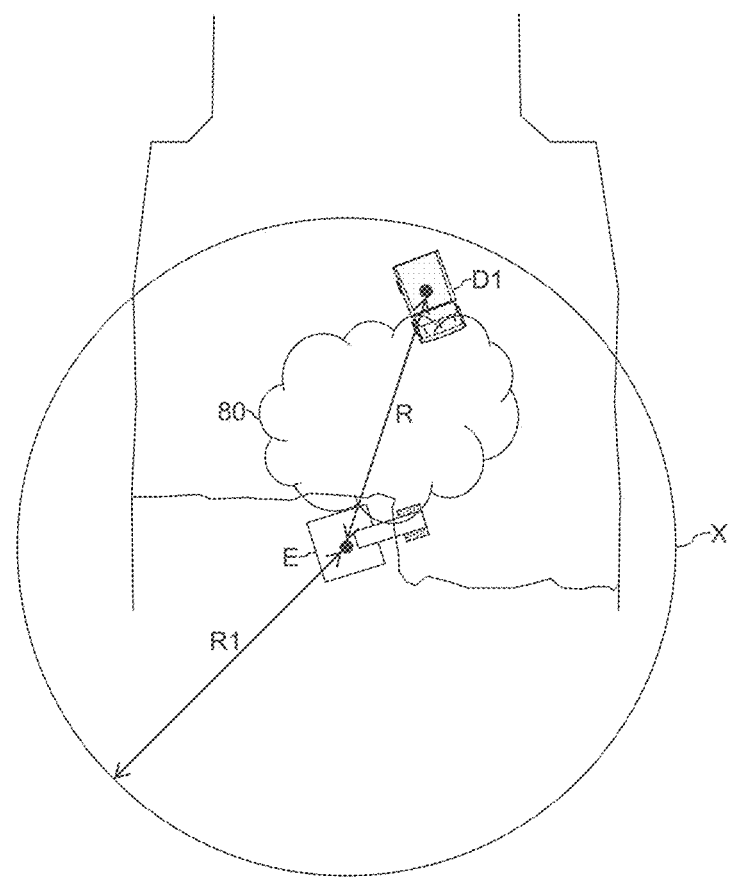
FIG. 18 is a conceptual diagram of a dust generation area in a third embodiment of the present invention.

For example, machines (machine model, machine body ID, and so forth) that become a dust generation source are registered in advance, and a distance R from the machine located closest at the time of vehicle stop is computed by the in-vehicle controller 24, and it is determined whether the distance R is equal to or shorter than a set distance R1 defined in advance. The set distance R1 is set with an assumption of the distance across which soil dust generated by the machine that becomes a dust generation source is scattered. When the distance R is equal to or shorter than the set distance R1, the set time is computed by the in-vehicle controller 24 according to the received work state of the machine. In this example, as illustrated in FIG. 18, an area within the set distance R1 from the machine that becomes a dust generation source, such as the hydraulic excavator 10, is a dust generation area X. The dust generation area X is not limited to being immovable. For example, when the hydraulic excavator 10 moves in association with movement of an excavation position in an excavation area, the dust generation area X also moves correspondingly. The present embodiment is similar to the second embodiment except for such a way of determination of the area in which vehicle stop is caused. When vehicle stop is caused in the dust generation area X, the set time is computed according to the work state of the relevant machine.

When a plurality of machines exist near a vehicle stop position and the vehicle stop position is included in all of a plurality of dust generation areas of them, it is possible to employ a method in which the maximum value of values according to the respective work states of the machines of these dust generation areas is computed as the set time.

Furthermore, it is also possible that, when vehicle stop is caused in the dust generation area X, simply the set time is computed to be longer than that when vehicle stop is caused in another area irrespective of the work state of the machine that operates in the dust generation area X.

Fourth Embodiment

Figure 19:
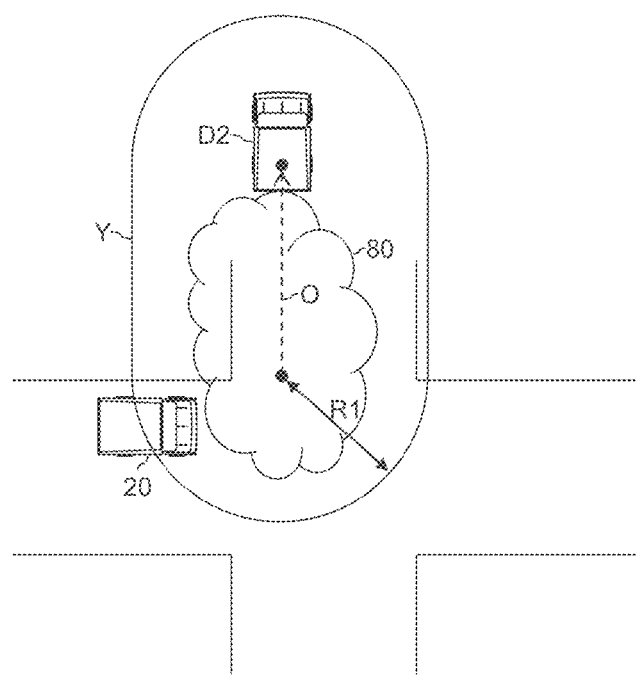
FIG. 19 is one example of a conceptual diagram of the dust generation area in a fourth embodiment of the present invention.
Figure 20:
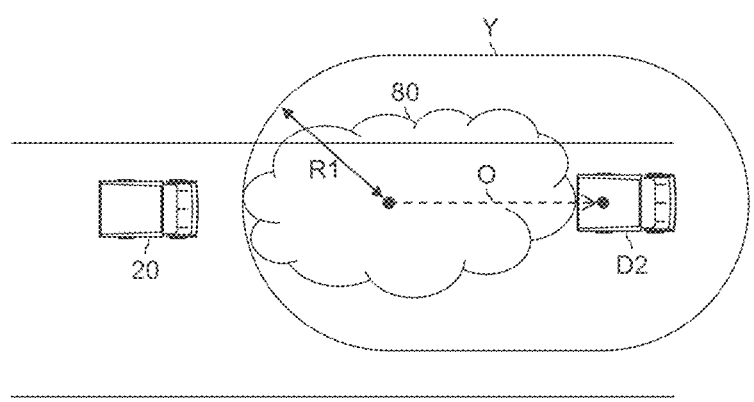
FIG. 20 is another example of a conceptual diagram of the dust generation area in the fourth embodiment of the present invention.

FIG. 19 is one example of a conceptual diagram of the dust generation area in a fourth embodiment of the present invention. FIG. 20 is another example of a conceptual diagram of the dust generation area in the fourth embodiment of the present invention. In FIG. 19, the state is exemplified in which a dump truck D2 has traversed, within a past predetermined time period, the front side of the travelling route of the dump truck 20 (self-vehicle) in the intersection area. In FIG. 20, the state is exemplified in which the dump truck D2 is travelling on the travelling route of the dump truck 20 while preceding the dump truck 20.

The different point of the present embodiment from the first embodiment is that the dust generation area is a moving area whose position moves and an area within a set distance R1 from a trajectory (line segment) O of another hauling vehicle (here assumed as dump truck D2) in the past predetermined time is defined as a dust generation area Y. The set distance R1 is set with an assumption of the distance across which soil dust generated at a certain spot due to the passing of the dump truck D2 is scattered. The predetermined time is set with an assumption of the time in which soil dust soared up by the dump truck D2 at a certain spot substantially settles.

The dust generation area Y in the present embodiment is a moving area that moves in such a manner as to accompany the dump truck D2 and the shape and the length thereof also change according to the trajectory and the velocity of the dump truck D2. When the trajectory of the dump truck D2 in the past predetermined time is a linear trajectory, the dust generation area Y becomes a rounded rectangular shape as in FIG. 19 and FIG. 20. When the dump truck D2 takes a curve, the dust generation area Y also curves. Furthermore, when the velocity of the dump truck D2 in the past predetermined time is higher, the trajectory O during this period becomes longer and correspondingly the dust generation area Y also becomes longer. It is conceivable that, in the dust generation area Y, a large amount of soil dust generated by the dump truck D2 that is a moving dust generation source has not yet settled.

Moreover, although not illustrated in FIG. 19 and FIG. 20, there is also a scene in which the dump truck 20 and the dump truck D2 as an oncoming vehicle pass each other when the travelling route is a both-way road as another scene in which the dump truck 20 enters the dust generation area Y.

Figure 21:
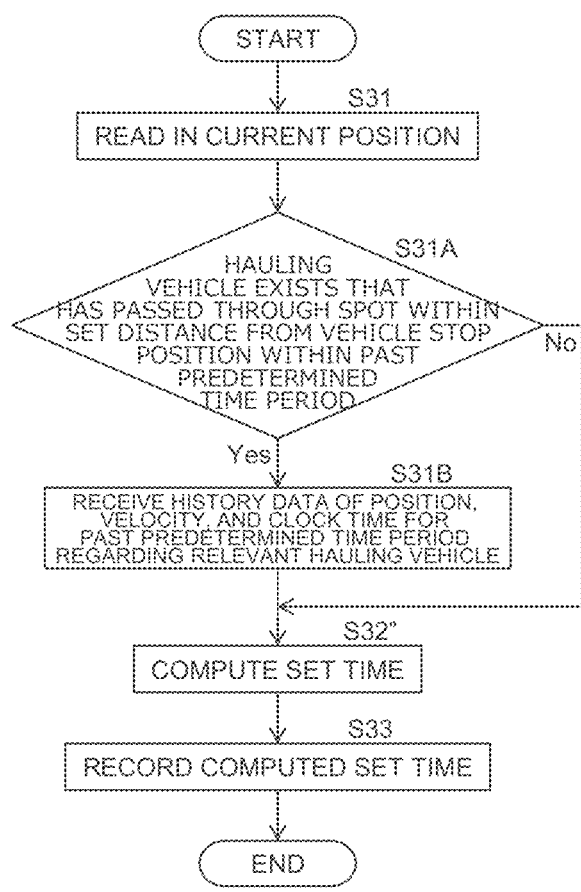
FIG. 21 is a flowchart representing the processing procedure of the set time computation function in the fourth embodiment of the present invention.

FIG. 21 is a flowchart representing the processing procedure of the set time computation function F4 in the fourth embodiment of the present invention. FIG. 21 corresponds to FIG. 9 of the first embodiment. The procedure illustrated in FIG. 21 is repeatedly executed by the CPU 24a with a short cycle time (for example, 0.1 s) while the in-vehicle controller 24 is energized, similarly to the flow of FIG. 9 of the first embodiment. Due to this, the set time is computed in real time according to the current position of the dump truck 20. Alternatively, instead of being executed in real time (that is, always), the flow of FIG. 21 may be executed at the time of execution of the alarm function F3, that is, every time the determination value 1 representing that the distance meter 22 is in the dirt-presumed state is recorded in the memory 24b in the step S13 in FIG. 7. In the flow of FIG. 21, the procedures of the steps S31 and S33 are the same as the procedures of the steps S31 and S33 in FIG. 9.

Upon starting the flow of FIG. 21, the CPU 24a reads in current (latest) position data of the dump truck 20 from the memory 24b (step S31). Thereafter, the CPU 24a determines whether another dump truck D2 exists that has passed through a spot within the set distance R1 from the vehicle stop position (current position) within the past predetermined time period (step S31A). Here, for example, position data of each sampling time (for example, one second) for the past predetermined time period (for example, 10 seconds) regarding each dump truck D2 that is another vehicle is received from the management controller 30 or each dump truck D2. Then, a distance R between the position of each dump truck 20 at each clock time and the current position of the dump truck (self-vehicle) is compared with the set distance R1. For example, when even one of the distances R of the respective clock times within the past predetermined time period is within the set distance R1 regarding the certain dump truck D2, the dump truck D2 is determined as the relevant vehicle.

When the relevant dump truck D2 exists as the result of the determination of the step S31A, the CPU 24a transmits a query signal to the management controller 30 and receives history data for the past predetermined time period regarding the relevant dump truck D2 from the management controller 30 (step S31B). The history data received here is, for example, a dataset of the position, the velocity, and the clock time of every sampling time within the past predetermined time period regarding the relevant dump truck D2. When a plurality of relevant dump trucks D2 exist, the history data is received regarding these plurality of dump trucks D2.

Upon receiving the history data of the dump truck D2, the CPU 24a computes the set time on the basis of the history data as described later (step S32"). When a plurality of relevant dump trucks D2 exist, the CPU 24a computes a plurality of set times based on the history data of the respective dump trucks D2 and employs the maximum value as the set time. When the relevant dump truck D2 does not exist, the CPU 24a skips the procedure of the step S31B and computes the set time on the basis of a data table (for example, FIG. 10 or FIG. 16) corresponding to the current position in the step S32". Upon computing the set time in the step S32" in this manner, the CPU 24a records the computed set time in the memory 24b to end the flow of FIG. 21 (step S33).

One example of the method for computing the set time on the basis of the history data of the dump truck D2 in the step S32" will be described. Regarding the dust generation area Y relating to the dump truck D2, the in-vehicle controller 24 changes the length of the set time depending on the velocity and the elapsed time after passing regarding the dump truck D2 because the dust generation area Y is a moving area. In the present embodiment, the dust generation area Y is computed in such a manner as to become longer when the travelling velocity of the dump truck D2 in passing through the dust generation area Y is higher and become shorter when the elapsed time from passing through the dust generation area Y by the dump truck D2 is longer.

Specifically, set times Tt are computed by expression (1) exemplified below about the respective clock times on the basis of data of each sampling clock time in the past predetermined time and a statistic (for example, maximum value, average, or the like) of these set times Tt of the respective clock times can be computed as the set time T.

$$Tt = T0 + \alpha V/(L \times \Delta t) \tag{1}$$

Here, Tt: the set time based on data of a clock time t within the past predetermined time period, T0: a reference set time, V: the velocity of the relevant dump truck D2 at the clock time t, L: the distance from the relevant dump truck D2 at the clock time t, $\Delta t$: the elapsed time from the clock time t to the current time, and $\alpha$: a coefficient. The reference set time T0 is the minimum set time and is the set time of areas (for example, other areas in FIG. 10) other than the dust generation area Y.

Regarding the contents of processing by the other controllers and the hardware configuration thereof, the present embodiment is similar to the first embodiment.

Also in the present embodiment, effects similar to those of the first embodiment are obtained. In addition, the dust generation area Y attributed to another dump truck D2 that is a moving dust generation source can also be taken into consideration and the set time T can be computed more properly. Furthermore, in computing the set time about the dust generation area Y, the set time is increased or decreased according to the velocity and the passing timing of the dump truck D2 of the dust generation area Y. This further improves the validity of the set time T.

However, in computing the set time simply in consideration of the positional relation with another dump truck D2 that is a moving dust generation source, the set time does not necessarily need to be increased or decreased depending on the velocity and the passing timing of the dump truck D2. For example, the set time about the dust generation area Y may be set to a uniform fixed value.

Fifth Embodiment

Figure 22:
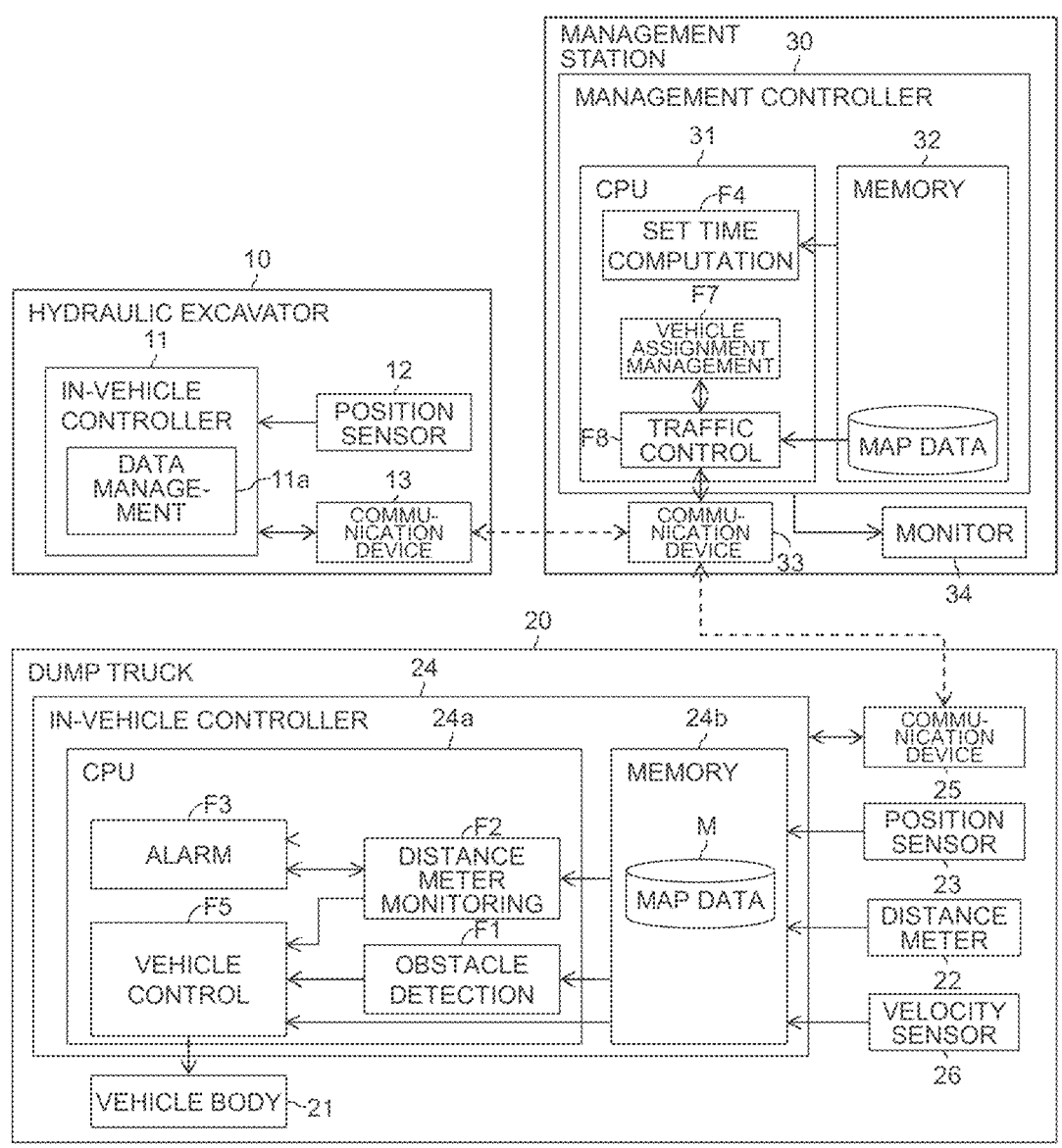
FIG. 22 is a functional block diagram of a hauling system according to a fifth embodiment of the present invention.

FIG. 22 is a functional block diagram of a hauling system according to a fifth embodiment of the present invention. This diagram corresponds to FIG. 2 of the first embodiment and an element that is similar to or corresponds to one in the first embodiment in FIG. 22 is given the same numeral as FIG. 2 and description thereof is omitted.

The difference of the present embodiment from the first embodiment is that the set time computation function F4 is executed by not the in-vehicle controller 24 of the dump truck 20 but the CPU 31 of the management controller 30.

Specifically, a plurality of areas set along the travelling route of the dump truck 20 and the set time (FIG. 16) set regarding each of these areas are stored in the memory 32 of the management controller 30 as with the memory 24b of the in-vehicle controller 24 of the first embodiment. In the present embodiment, the flow described with FIG. 9 is executed by the CPU 31 of the management controller 30 in response to a request signal from the in-vehicle controller 24 and the set time is transmitted to the in-vehicle controller 24 through the communication device 33.

Similarly to the first embodiment, the in-vehicle controller 24 makes the primary determination of the dirt-presumed state of the objective surface of the distance meter 22 and stops the dump truck 20. Then, the in-vehicle controller 24 executes the secondary determination after the elapse of the set time about which a query has been made to the management controller 30, and executes notification of an alarm or resumption of autonomous operation. Setting of the dust generation area and thus computation of the set time are not limited to the first embodiment, and it is also possible to apply the methods of the second to fourth embodiments, of course. The flow of holding of the alarm described with FIG. 13 can also be similarly executed also in the present embodiment naturally.

As in the present embodiment, similar effects can be obtained also when not the in-vehicle controller 24 of the dump truck 20 but an external computer is allowed to have the function of computing the set time.

MODIFICATION EXAMPLES

In the above embodiments, the examples have been described in which a value different according to the vehicle stop position is computed as the set time when the dump truck 20 has presumed dirt of the objective surface of its own distance meter 22. However, the set time does not necessarily need to be a variable value. That is, a configuration may be made in which the set time is set to the same value irrespective of the vehicle stop position and the secondary determination is executed after the uniform set time has passed after it is determined that the distance meter 22 is in the dirt-presumed state and vehicle stop is caused. Also in this case, false detection of soil dust or the like as dirt that adheres to the objective surface and requesting useless heading-out of the worker can be suppressed although there is a possibility of increase in scenes in which the vehicle stop time becomes long beyond necessity in an area other than the dust generation area.

Furthermore, the hydraulic excavator 10 has been exemplified as the loading machine that loads earth and sand or the like into the dump truck 20 in the loading area. However, the loading machine is not limited to the hydraulic excavator and a wheel loader or the like is used in some cases. Moreover, the dump truck 20 has been exemplified as the hauling vehicle that hauls a load loaded by such a loading machine. However, it is also possible to substitute the dump truck 20 with a hauling vehicle of a crawler type in which a vessel is mounted on a vehicle equipped with crawlers, for example. The distance meter 22 and the systems of the respective embodiments to presume dirt thereof can be applied also to the hauling vehicle of the crawler type and similar effects can be provided.

Moreover, in the explanation of FIG. 7, description has been made by taking as an example the case in which dirt of the objective surface of the distance meter 22 is determined based on the distance measured by the distance meter 22. However, the method for determining dirt can be changed. As one example, it is possible to apply a method in which ranging of an object about which the intensity of reflected light with respect to laser light is known is executed and dirt of the objective surface of the distance meter is presumed when measured signal intensity is lower than a set value. Besides, it is possible to apply also a method in which laser light scattered by a foreign object that adheres to the objective surface is measured and dirt of the objective surface of the distance meter is presumed when the intensity of the scattered light exceeds a set value.

DESCRIPTION OF REFERENCE CHARACTERS

1: Hauling system
10: Hydraulic excavator (machine)
11: In-vehicle controller
20: Dump truck (hauling vehicle)
21: Vehicle body
22: Distance meter
23: Position sensor
24: In-vehicle controller
24b: Memory
25: Communication device (first communication device)
30: Management controller
32: Memory
33: Communication device (second communication device)
34: Monitor
90: Alarm screen
91: First button
92: Second button
O: Trajectory
R1: Set distance
T: Set time
X, Y: Dust generation area

The invention claimed is:

1. A hauling vehicle comprising:
a vehicle body; a distance meter that measures distance to an obstacle; a position sensor that acquires position data of the vehicle body; an in-vehicle controller that controls the vehicle body on a basis of an output of the position sensor; and a communication device that communicates with a management controller that manages the vehicle body, wherein
the in-vehicle controller is configured to
execute primary determination of whether or not the distance meter is in a dirt-presumed state in which dirt of an objective surface of the distance meter is presumed on a basis of an output of the distance meter,
command the vehicle body to stop at a current position when determining that the distance meter is in the dirt-presumed state in the primary determination,
execute secondary determination of whether or not the distance meter is in the dirt-presumed state on the basis of the output of the distance meter after elapse of a set time from the execution of the primary determination with the vehicle body stopped at the current position,
transmit an alarm to the management controller through the communication device when determining that the distance meter is in the dirt-presumed state in the secondary determination, and
command the vehicle body to resume travelling of the vehicle body when determining that the dirt-presumed state has been eliminated in the secondary determination; wherein
the in-vehicle controller is configured to permit dumping operation of the vehicle body without stopping the dumping operation even when determining that the distance meter is in the dirt-presumed state in the primary determination.

2. A hauling vehicle comprising:
a vehicle body; a distance meter that measures distance to an obstacle; a position sensor that acquires position data of the vehicle body; an in-vehicle controller that controls the vehicle body on a basis of an output of the position sensor; and a communication device that communicates with a management controller that manages the vehicle body, wherein
the in-vehicle controller is configured to
execute primary determination of whether or not the distance meter is in a dirt-presumed state in which dirt of an objective surface of the distance meter is presumed on a basis of an output of the distance meter,
command the vehicle body to stop at a current position when determining that the distance meter is in the dirt-presumed state in the primary determination,
execute secondary determination of whether or not the distance meter is in the dirt-presumed state on the basis of the output of the distance meter after elapse of a set time from the execution of the primary determination with the vehicle body stopped at the current position,
transmit an alarm to the management controller through the communication device when determining that the distance meter is in the dirt-presumed state in the secondary determination, and
command the vehicle body to resume travelling of the vehicle body when determining that the dirt-presumed state has been eliminated in the secondary determination wherein
the in-vehicle controller
includes a memory that stores a plurality of areas set along a travelling route of the vehicle body and the set time corresponding to each of these areas, and
is configured to determine an area in which the vehicle body is currently located on a basis of the position data of the vehicle body, and
compute the set time corresponding to the area in which the vehicle body is currently located.

3. The hauling vehicle according to claim 2, wherein
the plurality of areas include a dust generation area and other areas excluding the dust generation area, and
the set time of the dust generation area is set long compared with the set time of the other areas.

4. The hauling vehicle according to claim 3, wherein
the dust generation area is a fixed area whose position is fixed.

5. The hauling vehicle according to claim 4, wherein
the dust generation area is a loading area, a dumping area, or an intersection area.

6. The hauling vehicle according to claim 3, wherein
the set time of the dust generation area is different according to a work state of a machine disposed in the dust generation area, and
the in-vehicle controller is configured to receive data from the management controller or the machine through the communication device regarding the work state of the machine that operates in the dust generation area, and compute the set time of the dust generation area according to the work state of the machine.

7. The hauling vehicle according to claim 3, wherein
the dust generation area is an area in which distance from a registered machine is equal to or shorter than a set distance.

8. The hauling vehicle according to claim 3, wherein
the dust generation area is a moving area whose position moves.

9. The hauling vehicle according to claim 8, wherein
the moving area is an area within a set distance from a trajectory of another hauling vehicle in a past predetermined time.

10. The hauling vehicle according to claim 9, wherein
the in-vehicle controller is configured to compute the set time in such a manner that the set time becomes longer when travelling velocity of the other hauling vehicle is higher and becomes shorter when an elapsed time from passing of the other hauling vehicle is longer.

11. A hauling system comprising:
a hauling vehicle including a vehicle body, a distance meter that measures distance to an obstacle, a position sensor that acquires position data of the vehicle body, an in-vehicle controller that controls the vehicle body on a basis of an output of the position sensor, and a first communication device that communicates with a management controller that manages the vehicle body; and
the management controller having a second communication device that communicates with the in-vehicle controller, wherein
the in-vehicle controller is configured to
execute primary determination of whether or not the distance meter is in a dirt-presumed state in which dirt of an objective surface of the distance meter is presumed, on a basis of an output of the distance meter,
command the vehicle body to stop at a current position when determining that the distance meter is in the dirt-presumed state in the primary determination, receive a set time that is a time difference between secondary determination of whether or not the distance meter is in the dirt-presumed state and the primary determination from the management controller through the first communication device, execute the secondary determination on the basis of the output of the distance meter at elapse of the set time from the execution of the primary determination, transmit an alarm to the management controller through the first communication device when determining that the distance meter is in the dirt-presumed state in the secondary determination, and command the vehicle body to resume travelling of the vehicle body when determining that the dirt-presumed state has been eliminated in the secondary determination, and the management controller includes a memory that stores a plurality of areas set along a travelling route of the vehicle body and a set time set regarding each of these areas, and is configured to determine an area in which the vehicle body is currently located on a basis of the position data of the vehicle body, compute the set time corresponding to the area in which the vehicle body is currently located, and transmit the set time to the in-vehicle controller through the second communication device.

12. The hauling system according to claim 11, wherein the management controller is configured to display, on a monitor, an alarm screen including a first button operated in a case of responding to the alarm from the in-vehicle controller and a second button operated in a case of holding the alarm, close the alarm screen when the second button is operated, determine whether the dirt-presumed state continues for a holding time set in advance, redisplay the alarm screen on the monitor when the dirt-presumed state continues also after elapse of the holding time, and cancel processing of redisplaying the alarm screen when the dirt-presumed state has been eliminated during the holding time.

* * * * *